(12) United States Patent
Takahashi

(10) Patent No.: US 8,218,163 B2
(45) Date of Patent: Jul. 10, 2012

(54) OPERATING APPARATUS, CONTROLLING OPERATING APPARATUS, COMMUNICATION SYSTEM, AND MANAGING COMMUNICATION SYSTEM

(75) Inventor: Shintaroh Takahashi, Tokyo (JP)

(73) Assignee: Ricoh Co., Ltd., Tokyo (JP)

( * ) Notice: Subject to any disclaimer, the term of this patent is extended or adjusted under 35 U.S.C. 154(b) by 1231 days.

(21) Appl. No.: 11/804,470

(22) Filed: May 17, 2007

(65) Prior Publication Data
US 2007/0291304 A1    Dec. 20, 2007

(30) Foreign Application Priority Data
May 18, 2006   (JP) .................................. 2006-138958

(51) Int. Cl.
*G06F 3/12* (2006.01)
(52) U.S. Cl. ....... 358/1.14; 358/1.15; 358/1.9; 358/1.13
(58) Field of Classification Search .................. 358/1.15, 358/1.9, 1.13, 1.14; 709/221; 235/492; 705/35; 713/100
See application file for complete search history.

(56) References Cited

U.S. PATENT DOCUMENTS

| | | | | |
|---|---|---|---|---|
| 6,669,099 B2 * | 12/2003 | Fujimura et al. | .............. | 235/492 |
| 6,747,755 B1 * | 6/2004 | Satomi et al. | ................ | 358/1.15 |
| 6,784,924 B2 * | 8/2004 | Ward et al. | ................. | 348/207.1 |
| 7,398,385 B2 * | 7/2008 | Yeh | ............... | 713/100 |
| 7,443,527 B1 * | 10/2008 | Shigeeda | .................... | 358/1.15 |
| 7,469,224 B2 * | 12/2008 | Foss, Jr. | .......................... | 705/35 |
| 7,733,521 B1 * | 6/2010 | Cavill et al. | .................... | 358/1.9 |
| 2003/0063305 A1 | 4/2003 | McIntyre | | |
| 2003/0100335 A1 * | 5/2003 | Gassho et al. | ................ | 455/552 |
| 2003/0227645 A1 * | 12/2003 | Hisatomi et al. | ............. | 358/1.13 |
| 2005/0198233 A1 * | 9/2005 | Manchester et al. | .......... | 709/221 |
| 2007/0121155 A1 * | 5/2007 | Machiyama | ................. | 358/1.15 |

FOREIGN PATENT DOCUMENTS

| | | |
|---|---|---|
| EP | 1 315 334 | 8/2005 |
| EP | 1 739 538 | 1/2007 |
| EP | 1 553 746 | 8/2007 |
| JP | H-178050 A | 6/1992 |
| JP | 2004-046803 | 2/2004 |
| JP | 2005-094301 | 4/2005 |
| JP | 2005-218035 A | 8/2005 |
| WO | WO2004/056076 A | 7/2004 |
| WO | WO 2004/058403 | 7/2004 |

OTHER PUBLICATIONS

European Search Report for EP Application No. 07252044.8-2416, mailed Aug. 7, 2007, 7 Pages.
"Universal Mobile Telecommunications System (UMTS)", ETSI Standards, European Telecommunications Standards Institute, Sophia-Antipo, FR, vol. 3-SAI, No. V3110, Oct. 2000, XP014007272, ISSN: 0000-0001.
European Search Report for EP Application No. EP 07252044.8-2416, mailed Oct. 17, 2007, 18 Pages.

(Continued)

*Primary Examiner* — Charlotte M Baker
*Assistant Examiner* — Ashish K Thomas
(74) *Attorney, Agent, or Firm* — Blakely, Sokoloff, Taylor & Zafman LLP

(57) ABSTRACT

A communication system, and a method of managing the communication system are provided, each of which allows an apparatus in the communication system is replaced in a timely manner when an error is detected in the apparatus.

17 Claims, 16 Drawing Sheets

OTHER PUBLICATIONS

Japanese Office Action dated Oct. 4, 2011; JP Patent Application No. 2006-138958, 2 pgs.

Chinese Office Action for related Chinese Patent Application No. 200710142107.X, Jan. 11, 2011, 5 pgs. *No translation provided*.

3rd Generation Partnership Project, "Technical Specification Group Services and System Aspects Service Aspects; Service Principles", 3GPP TS 22.101 3.11.0 (Oct. 2000), Oct. 31, 2010, 6 pgs.

* cited by examiner

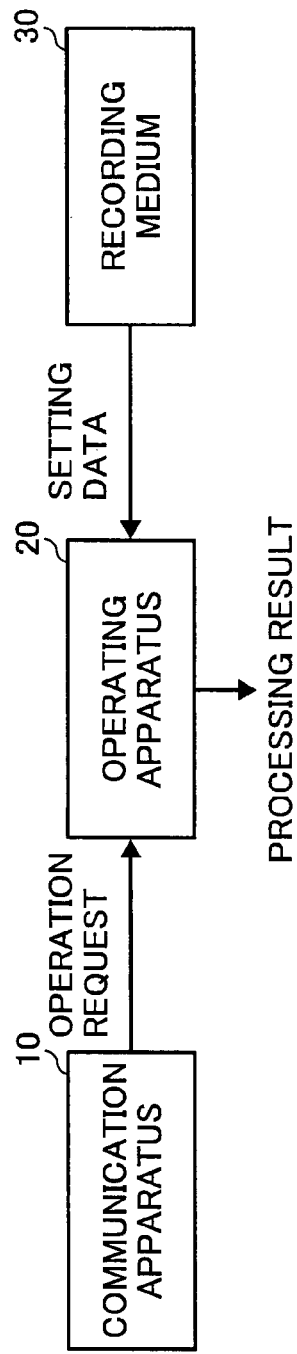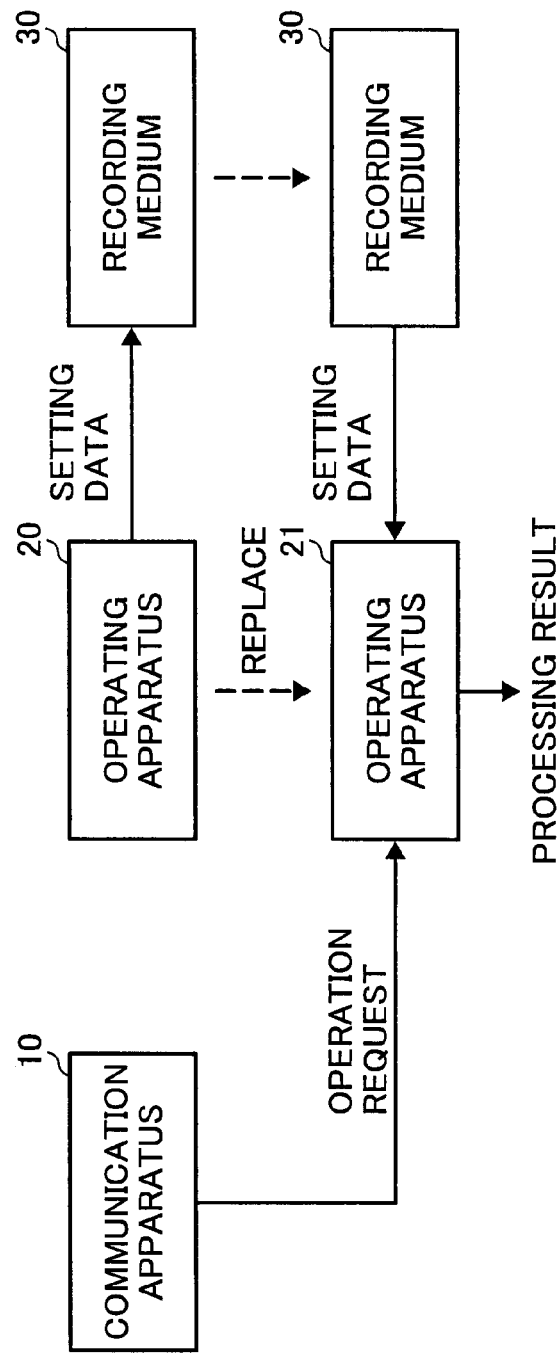

| DATA ITEM | SETTING DATA |
|---|---|
| DHCP | OFF |
| IP ADDRESS | 192. 168. 0. 2 |
| SUBNET MASK | 255. 255. 255. 0 |
| GATEWAY ADDRESS | 192. 168. 0. 1 |
| VALID PROTOCOL | TCP/IP |
| COMMUNICATION SPEED | AUTO |

| DATA ITEM | SETTING DATA |
|---|---|
| SSID | Wireless1 |
| ENCRYPTION | WPA |
| OPTION | AES |
| NETWORK KEY | networkkey123 |

| DATA ITEM | SETTING DATA |
|---|---|
| SD CARD USE | ON |
| SD CARD REQUIRED | ON |
| SLOT | LEFT |

| DATA ITEM | SETTING DATA |
|---|---|
| FORM | INVOICE |
| FONT | FONT FOR INVOICE |
| TRAY PRIORITY | TRAY 1 |
| EMULATION | RPCS |
| THICK PAPER | 105-163g/m$^2$ |

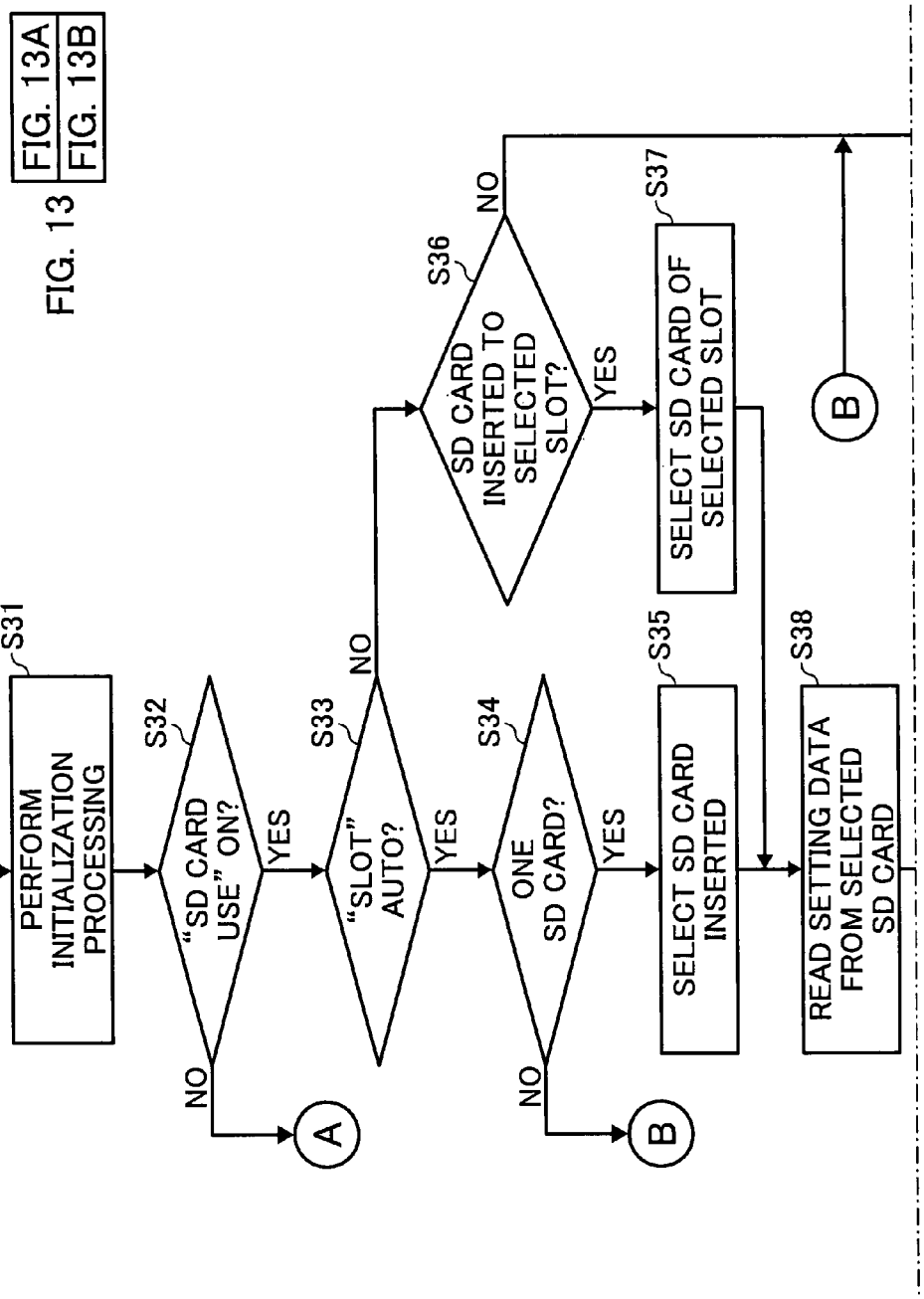

FIG. 14

```
SETTING DATA CHANGED TO REFLECT SD CARD

BEFORE
    IP ADDRESS          192. 168. 1. 8
    SUBNET MASK         255. 255. 255. 0
    DEFAULT GATEWAY     192. 168. 1. 1
    SSID                Wireless1
    ENCRYPTION          OPEN SYSTEM
    NETWORK KEY         ********

AFTER
    IP ADDRESS          [192. 168. 3. 15]
    SUBNET MASK         255. 255. 255. 0
    DEFAULT GATEWAY     [192. 168. 3. 1]
    SSID                [Wireless2]
    ENCRYPTION          OPEN SYSTEM
    NETWORK KEY         [********]
```

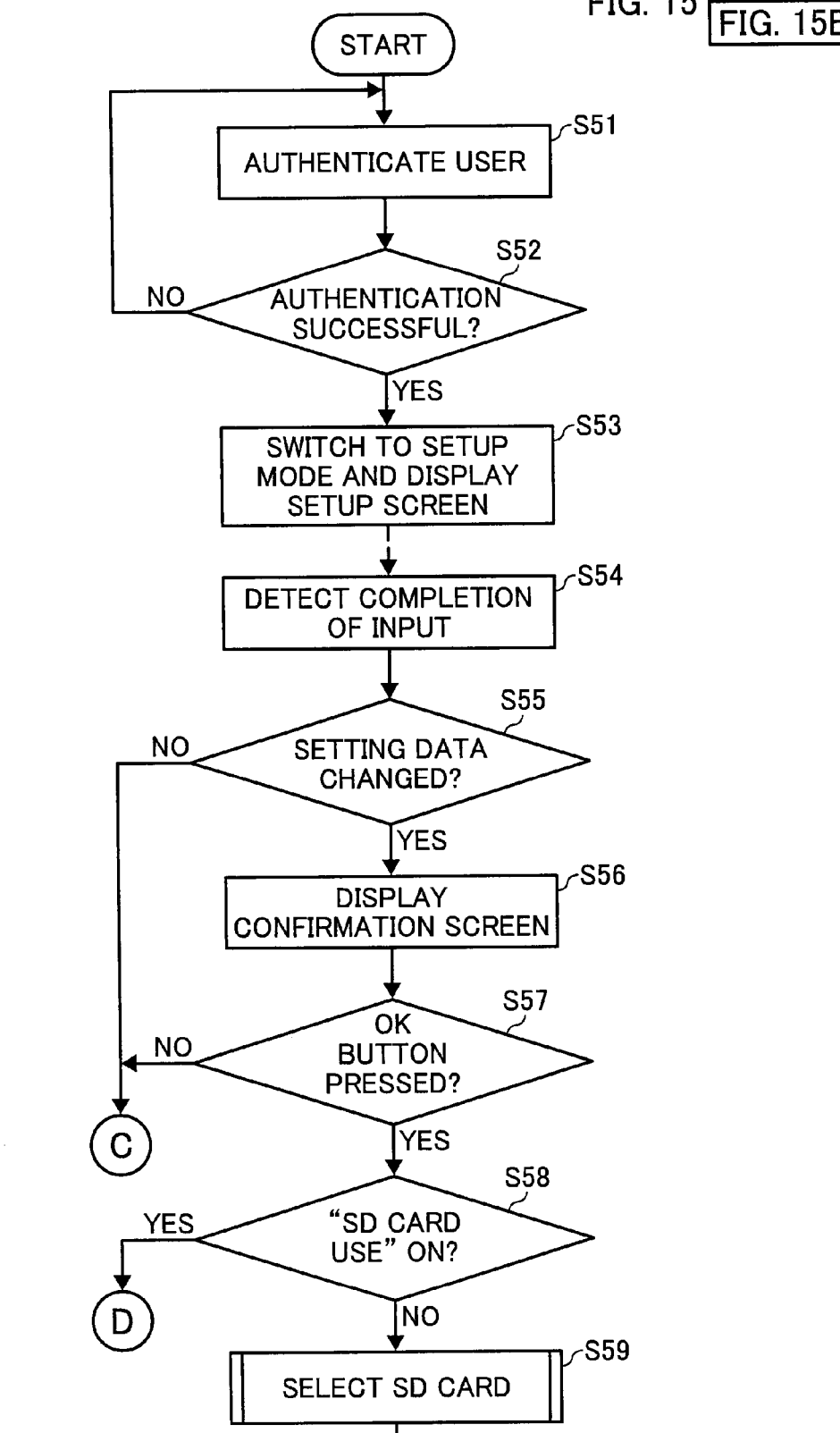

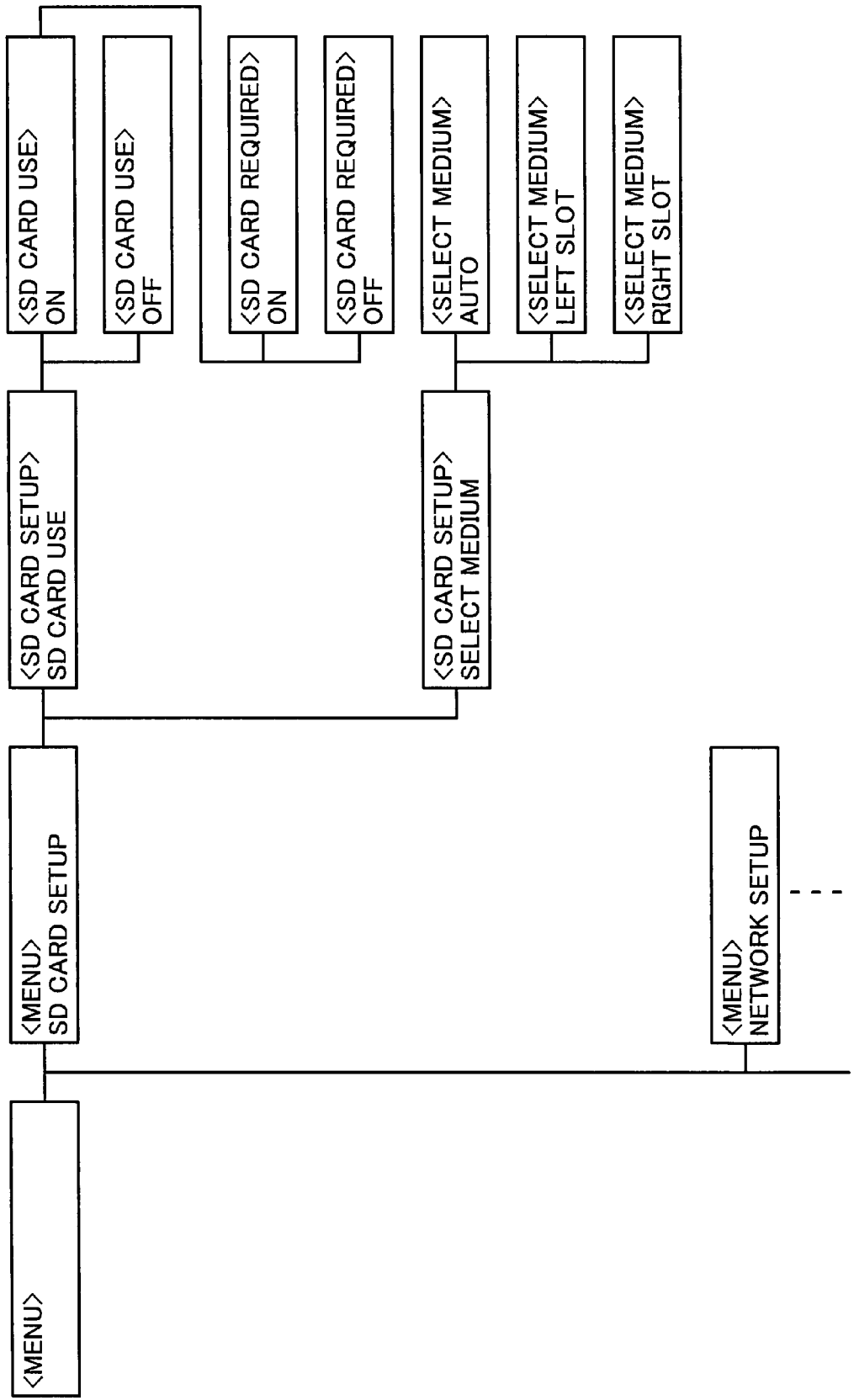

OPERATING APPARATUS, CONTROLLING OPERATING APPARATUS, COMMUNICATION SYSTEM, AND MANAGING COMMUNICATION SYSTEM

CROSS-REFERENCE TO RELATED APPLICATIONS

This patent application is based on and claims priority under 35 U.S.C. §119 to Japanese patent application Nos. 2006-138958 filed on May 18, 2006, in the Japanese Patent Office, the entire contents of which are hereby incorporated by reference.

FIELD OF THE INVENTION

Example embodiments of the present invention relate generally to an apparatus, method, system, computer program and product, each capable of communicating via a network, and a method of managing the system capable of communicating via the network.

DESCRIPTION OF THE RELATED ART

Recently, a wireless network communication system is used in various environments, for example, in a company, hospital, publisher, department store, etc. Since the wireless network communication system can be easily constructed when compared to the wired network communication system, the use of the wireless network communication system is especially beneficial at temporary sites such as exhibition, fairs, trade shows, gift centers, conferences, etc.

For example, when the wireless network communication system is implemented at the trade show, the communication system may include a plurality of printers each capable of printing a receipt. Under this situation, when one of the printers fails to operate normally, the printer cannot be used for long time until the printer is fixed by a service person, who may need to come to the trade show from another location. This may increase a waiting time for a customer, or discourage the customer from purchasing the goods.

In order to solve the above-described problem, the printer causing the error may be replaced by a backup printer previously prepared. In such case, the backup printer needs to be manually set such that he backup printer has the setting data used by the printer. However, a user who operates the printer is not usually familiar with the setting of the printer such that it may take time to complete setting, or an error may be generated during setting operation.

For example, when the user fails to change the value of a service set identifier (SSID) of the backup printer to be equal to the value of a SSID of the printer, the backup printer may connect to a wireless network different from a network to which the printer has been connected. Alternatively, the backup printer may not be able to connect to any wireless network.

Another approach to the above-described problem is to cause a selected printer to function as the printer causing the error. The selected printer may be selected from the plurality of printers existed on the communication system. In such case, the setting of a host apparatus that sends an operation request to the printer causing the error needs to be changed such that the operation request is sent to the selected printer. However, a user who operates the host apparatus is not usually familiar with the setting of the host apparatus such that it may take time to complete setting, or an error may be generated during setting operation. Further, when the receipt is output to the selected printer placed at the location different from the location where the printer cause the error is provided, the user may feel inconvenient in operating. Further, the work load of the selected printer may increase.

Another approach to the above-described problem is to previously provide a backup printer for each one of the printer provided on the communication system. However, this may increase the overall cost of the communication system, or it may require a larger space.

SUMMARY

In view of the above, there is a need for a communication system in which an apparatus in the communication system may be replaced in a timely manner when an error is detected in the apparatus.

An example embodiment of the present invention includes an operating apparatus capable of receiving an operation request from a wireless network, which is provided with a removable recording medium storing network setting data. The operating apparatus does not accept the operation request when the network setting data stored in the removable recording medium is not readable from the removable recording medium. The network setting data may include destination identification information to be used for identifying a destination specified by the operation request and wireless identification information to be used for identifying the wireless network.

An example embodiment of the present invention includes an operating apparatus provided with a removable recording medium storing network setting data. The operating apparatus does not connect with a network when the network setting data stored in the removable recording medium is not readable from the removable recording medium. The network setting data may include wireless identification information to be used for identifying the wireless network.

In this example, the operating apparatus may store medium use setting data indicating whether to require the operating apparatus to use the removable recording medium in a memory. When the medium use setting data indicates the use of the removable recording medium is required, the operating apparatus does not accept the operation request or does not connect to the network.

An example embodiment of the present invention includes an operating apparatus capable of receiving an operation request from a wireless network, which is provided with a removable recording medium. The operating apparatus may further allow a user to input updated network setting data. The operating apparatus does not accept the operation request or does not connect to the network when the updated network setting data is not writable onto the removable recording medium In this example, the operating apparatus may store medium use setting data indicating whether to require the operating apparatus to use the removable recording medium in a memory. When the medium use setting data indicates the use of the removable recording medium is required, the operating apparatus does not accept the operation request or does not connect to the network.

An example embodiment of the present invention includes an operating apparatus capable of allowing a user to input updated network setting data through a user interface, which is provided with a removable recording medium. The operating apparatus does not store the updated network setting data in a memory when the network setting data is not writable onto the removable recording medium.

An example embodiment of the present invention includes a method of managing a communication system, which includes: providing a first operating apparatus and a communication apparatus that communicate with each other via a wireless network; replacing the first operating apparatus with a second operating apparatus upon detecting an error in the first operating apparatus, the second operating apparatus provided with a removable recording medium storing network setting data of the first operating apparatus; and activating the second operating apparatus to cause the second operating apparatus to connect to the wireless network using the network setting data stored in the removable recording medium.

In addition to the above-described examples, the present invention may be implemented in various other ways, for example, as a computer program product storing a computer program that causes any general-purpose computer to operate as any one of the above-described operating apparatuses, a communication system including any one of the above-described operating apparatuses, or a method of controlling any one of the above-described operating apparatuses.

For example, a method for managing a communication system may be provided, which includes: providing a first operating apparatus and a communication apparatus that communicate with each other via a wireless network; replacing the first operating apparatus with a second operating apparatus upon detecting an error in the first operating apparatus, the second operating apparatus provided with a removable recording medium storing network setting data of the first operating apparatus; and activating the second operating apparatus to cause the second operating apparatus to connect to the wireless network using the network setting data stored in the removable recording medium.

In this example, the second operating apparatus may store medium use setting data that requires the second operating apparatus to use the removable recording medium.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is an illustration for explaining operation of preparing for communication, performed by the operating apparatus shown in FIG. 1, according to an example embodiment of the present invention;

FIG. 3B is an illustration for explaining operation of preparing for communication, performed by an operating apparatus that replaces the operating apparatus shown in FIG. 1, according to an example embodiment of the present invention;

FIG. 7 is an example table storing network setting data to be used by the printer shown in FIG. 4 when connecting to a network;

FIG. 8 is an example table storing network setting data to be used by the printer shown in FIG. 4 when connecting to a wireless network;

FIG. 9 is an example table storing medium use setting data;

FIG. 10 is an example table storing printing setting data;

FIG. 14 is an example illustration for notifying the change made to setting data, output by the printer shown in FIG. 4;

FIG. 19 a flow diagram illustrating the correspondence among setup screens, each displayed by the printer shown in FIG. 4 according to a user instruction, when performing the operation of FIG. 17.

DETAILED DESCRIPTION OF THE INVENTION

Figure 1:
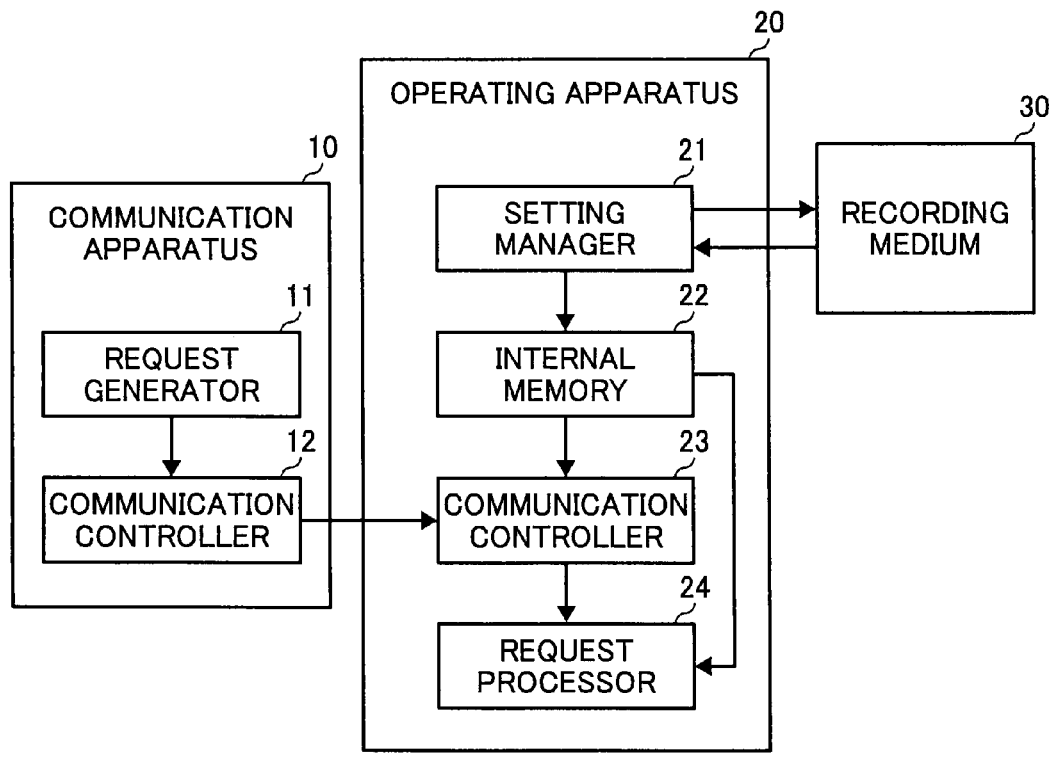
FIG. 1 is a schematic block diagram illustrating a communication system according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. For example, the singular forms "a", "an" and "the" are intended to include the plural forms as well, unless the context clearly indicates otherwise.

Referring now to the drawings, wherein like reference numerals designate identical or corresponding parts throughout the several views, FIG. 1 illustrates a communication system according to an example embodiment of the present invention. The communication system of FIG. 1 includes a communication apparatus 10 and an operating apparatus 20, which are connected via a network. In this example, the network includes at least a wireless network.

The operating apparatus 20 is capable of receiving data sent by the communication apparatus 10 via the wireless network, either directly through the communication apparatus 10 or through a relay apparatus such as a wireless access point (WAP) device. For example, when the communication apparatus 10 is capable of communicating only via a wired network, the operating apparatus 20 may receive data sent by the communication apparatus 10 via the WAP device. In such case, the network may include the wired network and the wireless network. Further, the two-way communication is not required for the communication between the communication apparatus 10 and the operating apparatus 20, as long as the operating apparatus 20 is capable of receiving data sent by the communication apparatus 10 via the network.

Still referring to FIG. 1, the communication apparatus 10 includes a request generator 11 and a communication controller 12. The request generator 11 generates data, such as an operation request that requests the operating apparatus 20 to perform a desired operation. The communication controller 12 sends the operation request, generated by the request generator 11, to the operating apparatus 20 through the network. The communication apparatus 10 may be implemented by any general-purpose computer, which may include a processor such as a central processing unit (CPU), a memory such as a read only memory (ROM), random access memory (RAM), and/or a hard disk drive (HDD), and a communication interface.

The operating apparatus 20 includes a setting manager 21, an internal memory 22, a communication controller 23, and a request processor 24. The operating apparatus 20 may further include a recording medium interface 206 (FIG. 2) to which a removable recording medium 30 may be attached. The recording medium 30 may be implemented by any desired involatile recording medium or device, including, for example, a secure digital (SD) card, compact flash memory, universal serial bus (USB) memory, USB hard disk, etc., which may be attached to or removed from the operating apparatus 20.

The operating apparatus 20 may be implemented in various ways, as long as the operating apparatus 20 is capable of performing operation requested by the operation request sent from the communication apparatus 10. For example, the operating apparatus 20 may be implemented by an image data processing apparatus such as a printer, scanner, facsimile, etc., a detection apparatus capable of outputting a detection result such as a sensor or monitoring camera, a display device capable of displaying a requested image or message such as an electric bulletin board or display, or a lighting apparatus capable of lighting according to a request received from the outside such as a lighting device or warning lamp. The communication system of FIG. 1 may be provided with a plurality of operating apparatuses 20 and a plurality of communication apparatuses 10, for example, as described below referring to FIG. 4.

The setting manager 21 of the operating apparatus 20 may control various kinds of setting data to be used by the operating apparatus 20. The setting data may include network setting data to be used for network communication, such as the Internet Protocol (IP) address that uniquely identifies the operating apparatus 20, a service set identifier (SSID) that uniquely identifies a group of wireless network apparatuses to which the operating apparatus 20 belongs, authentication information, encryption information, etc. The setting data may further include operation setting data to be used for performing operation requested by the operation request sent from the communication apparatus 10, such as printing setting data. For example, the setting manager 21 may read out setting data stored in the recording medium 30, and store the setting data onto the internal memory 22. Alternatively, the setting manager 21 may write setting data generated or edited by the operating apparatus 20 onto the internal memory 22 or the recording medium 30.

The internal memory 22 may be implemented by any desired memory capable of storing the setting data, such as the network setting data obtained by the setting manager 21, to be used by the operating apparatus 20. The setting data stored in the internal memory 22 may further include medium use setting data regarding the use of the recording medium 30. In one example, the medium use setting data may indicate whether to require the operating apparatus 20 to use the setting data stored in the recording medium 30 when preparing for communication with the communication apparatus 10. For example, when the medium use setting data indicates the use of the setting data stored in the recording medium 30 is required, and when the setting data is not readable from the recording medium 30, the operating apparatus 20 does not accept the operation request received from the outside, such as the operation request received from the communication apparatus 10. The setting data stored in the recording medium 30 may not be readable when an error is generated or the recording medium 30 itself is not available. Further, in this example, the setting data that is required for reading may correspond to the network setting data, or at least the IP address and the SSID of the network setting data.

In another example, the medium use setting data may indicate whether to require the operating apparatus 20 to store the setting data in the recording medium 30 after updating the setting data. For example, when the medium use setting data indicates the use of the recording medium 30 is required, and when the setting data is not writable onto the recording medium 30, the operating apparatus 20 does not accept the operation request received from the outside, such as the operation request received from the communication apparatus 10. At this time, the operating apparatus 20 may be prohibited from writing the setting data in the internal memory 22. The setting data may not be writable onto the recording medium 30 when an error is generated or the recording medium 30 itself is not available. Further, in this example, the setting data that is required for storing may correspond to the network setting data, or at least the IP address and the SSID of the network setting data.

The communication controller 23 may allow the operating apparatus 20 to communicate with the communication apparatus 10, either directly or indirectly through the wireless network. For example, the communication controller 23 may receive the operation request from the communication apparatus 10, and send the operation request to the request processor 24.

The request processor 24 may perform operation or processing according to the operation request received by the communication controller 23. Such operation or processing may include printing image data, reading image data, sending image data, editing image data, transferring the operation request to another apparatus, etc. The communication controller 23 or the request processor 24 may operate according to the setting data stored in the internal memory 22, such as the operation setting data. Alternatively, the setting manager 21 may send the setting data, such as the operation setting data, read out from the recording medium 30 to the communication controller 23 or the request processor 24 to cause the communication controller 23 or the request processor 24 to operate according to the operation setting data.

In this example, the communication apparatus 10 may generate the operation request as a remote procedure call (RPC) request that requests an application program of the operating apparatus 20 to perform operation, such as by providing an argument. Upon receiving the operation request, the operating apparatus 20 may send an operation response, which indicates the result of processing the requested operation, such as by including a return value. For example, the operation request or the operation response may be generated in the form of SOAP message, and sent through the network using a HyperText Transfer Protocol (HTTP) or Simple Mail Transfer Protocol (SMTP).

In another example, the communication apparatus 10 may generate the operation request as print data written in the printer language, when the communication apparatus 10 requests the operating apparatus 20 to perform image forming. Upon receiving the operation request, the operating apparatus 20 may perform image forming in a manner requested by the operation request. The operation request may be generated in various other ways depending on the type of the communication system shown in FIG. 1.

Figure 2:
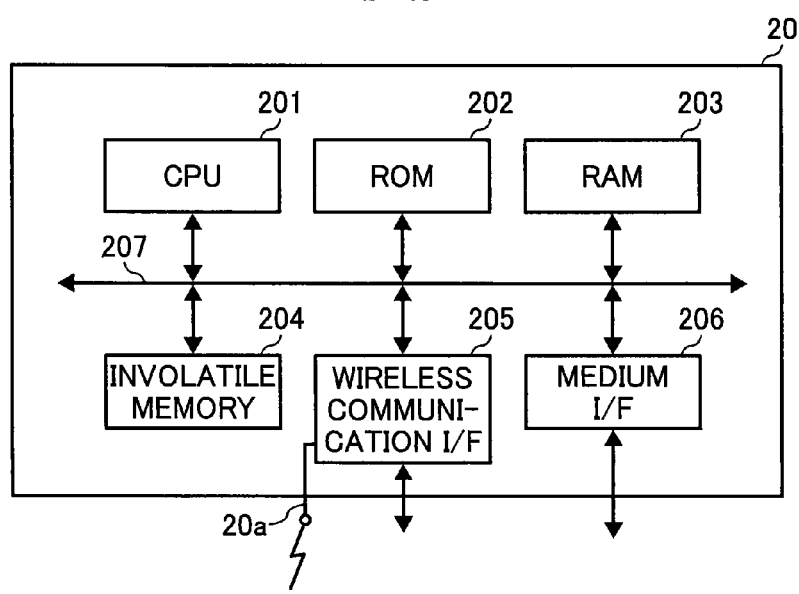
FIG. 2 is a schematic block diagram illustrating a hardware structure of an operating apparatus shown in FIG. 1.

Referring to FIG. 2, a hardware structure of the operating apparatus 20 is explained according to an example embodiment of the present invention. The operating apparatus 20 may include a central processing unit (CPU) 201, a read only memory (ROM) 202, a random access memory (RAM) 203, an involatile memory 204, a wireless communication interface (I/F) 205, and the recording medium I/F 206, which are connected via a system bus 207.

The CPU 201 controls operation of the operating apparatus 20. For example, the CPU 201 may perform various operation according to one or more kinds of control programs stored in the ROM 202 or the involatile memory 204, including operation of reading the setting data stored in the recording medium 30.

The ROM 202 may be implemented by any desired involatile memory capable of storing computer programs to be executed by the CPU 201 or parameters to be used by the CPU 201. The ROM 202 may be implemented by any desired rewritable memory such that data may be updated any time. The RAM 203 may temporarily store data. Alternatively, the RAM 203 may function as a work memory of the CPU 201. The involatile memory 204 may be implemented by any desired involatile memory, which may be rewritable, such as a flash memory, hard disk drive (HDD), etc. The involatile memory 204 may store programs to be executed by the CPU 201, or setting data or parameters to be used by the CPU 201. The data stored in the involatile memory 204 is retained even after turning off of the power supply. The setting data stored in the involatile memory 204 may include the network setting data, medium use setting data, operation setting data, etc.

The wireless communication I/F 205, which may be provided with a wireless antenna 20a, may be implemented by any desired interface that allows communication with the communication apparatus 10 via a wireless network. In this example, the wireless communication I/F 205 connects the operating apparatus 20 with a wireless network, such as the wireless LAN, in compliance with the Institute of Electrical and Electronic Engineers (IEEE) 802.11 standard. In this example, any desired communication protocol or specification, or any number of communication protocol or specification, may be used. When a plurality of communication protocols or specifications is used, the corresponding number of wireless communication I/F 205 may be provided.

The recording medium I/F 206 may be implemented by any desired interface to which the recording medium 30 can be attached. When the recording medium 30 is attached, the CPU 201 may read out setting data stored in the recording medium 30, and use the setting data to prepare for communication with the communication apparatus 10. Alternatively, the CPU 201 may write setting data onto the recording medium 30 through the recording medium I/F 206.

Figure 5:
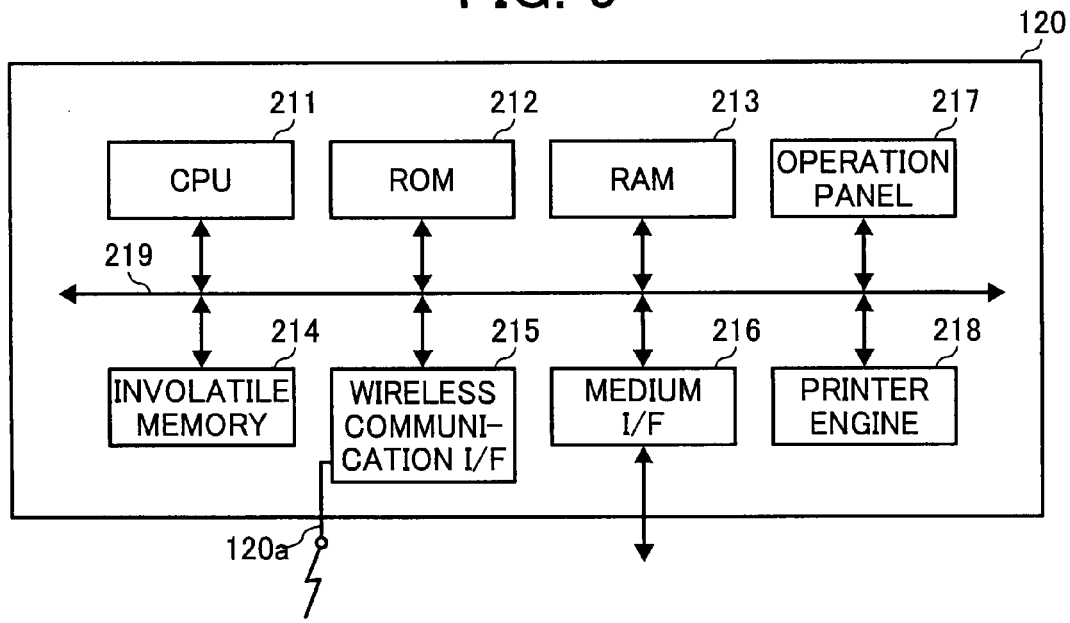
FIG. 5 is a schematic block diagram illustrating a hardware structure of a printer shown in FIG. 4.

The operating apparatus 20 may be additionally provided with an engine capable of outputting data. For example, the operating apparatus 20 may be provided with a printer engine, which performs image forming operation under control of the CPU 201, as illustrated in FIG. 5.

Referring to FIG. 3A, operation of preparing for communication with the communication apparatus 10, performed by the operating apparatus 20, is explained according to an example embodiment of the present invention. The operating apparatus 20 may read out network setting data from the involatile memory 204 (FIG. 2), such as the IP address and the SSID, to prepare communication with the communication apparatus 10. Alternatively, when the recording medium 30 is attached to the medium I/F 206 (FIG. 2), the operating apparatus 20 may read out network setting data, such as the IP address and the SSID, from the recording medium 30. Upon receiving the operation request from the communication apparatus 10, the operating apparatus 20 may perform the operation requested by the operation request. At this time, the operating apparatus 20 may send the result of processing the operation request to the communication apparatus 10.

As described above referring to FIG. 3A, when the recording medium 30 is attached, the operating apparatus 20 reads out the network setting data from the recording medium 30, and stores the network setting data in the internal memory 22. Accordingly, it is not necessary for a user to manually input the network setting data, such as the IP address and the SSID that may be needed for establishing communication with the communication apparatus 10. In addition to the network setting data, the operating apparatus 20 may read out other kind of setting data, such as the operation setting data, from the recording medium 30.

Referring to FIG. 3B, operation of preparing for communication with the communication apparatus 10, performed by an operating apparatus 21 that replaces the operating apparatus 20, is explained according to an example embodiment of the present invention. In this example, an error is detected in the operating apparatus 20. In such case, the operating apparatus 20 is disconnected from the communication system of FIG. 3B, and the operating apparatus 21 is placed at the location where the operating apparatus 20 is provided. Before disconnecting the operating apparatus 20, the operating apparatus 20 may store network setting data onto the recording medium 30, such as the IP address or the SSID. Alternatively, the recording medium 30 may previously store the network setting data of the operating apparatus 20. The recording medium 30 storing the network setting data is attached to the operating apparatus 21, which replaces the operating apparatus 20. Upon activation, the operating apparatus 21 may read out the network setting data from the recording medium 30 and prepare for communication with the communication apparatus 10 using the network setting data. In this manner, the operating apparatus 21 is recognized by a relay device or the communication apparatus 10 as the same device as the operating apparatus 20. Upon receiving the operation request from the communication apparatus 10, the operating apparatus 21 may perform the operation requested by the operation request. At this time, the operating apparatus 21 may send the result of processing the operation request to the communication apparatus 10. In addition to the network setting data, the recording medium 30 may store other kind of setting data, such as the operation setting data.

As described above referring to FIG. 3B, it is not necessary to manually change the setting of any one of the relay device, the communication apparatus 10 and the operating apparatus 21, in order to restore the communication system of FIG. 3B after the error is detected in the operating apparatus 20 as long as the recording medium 30 stores the network setting data used by the operating apparatus 20. This may suppress the occurrence of an error that may be caused by manually changing the setting of the device or apparatus. Further, since the manual operation is not required, a user, even a general user who is not familiar with setting operation, can easily solve the problem by simply replacing the operating apparatus 20 with the operating apparatus 21. Further, since the general user is capable of solving the problem, it is not necessary to call a service person or a person who has more knowledge. Accordingly, the communication system of FIG. 3B may be brought into operation in a timely manner right after the error is detected. Further, the cost of managing the communication system of FIG. 3B may be kept relatively low.

Further, as described above referring to FIG. 3B, the operating apparatus 21 is provided at the same location where the operating apparatus 20 is provided. This may help the user to operate more smoothly without feeling inconvenience in operating.

In this example, the operating apparatus 20 and the operating apparatus 21 may preferably have the same structure. Alternatively, the operating apparatus 20 and the operating apparatus 21 may have structures different from each other, as long as the operating apparatus 21 is capable of receiving the operation request sent by the communication apparatus 10 using the network setting data identical to the network setting data used by the operating apparatus 20.

Further, in this example, the operating apparatus 20 may additionally store operation setting data, which determines how the operation request is performed by the operating apparatus 20, in the recording medium 30 before being disconnected from the communication system of FIG. 3B. The operating apparatus 21 may read out the operation setting data, and performs the operation requested by the operation request according to the operation setting data.

Further, in this example, the operating apparatus 21 may additionally store medium use setting data, which requires the operating apparatus 21 to use the setting data stored in the recording medium 30. In this manner, the operating apparatus 21 can communicate with the communication apparatus 10 using the setting data identical to the setting data used by the operating apparatus 20, even when the operating apparatus 21 is previously provided with setting data different from the setting data used by the operating apparatus 20. For example, the operating apparatus 21 may normally operate according to the setting data stored in its involatile memory. When the operating apparatus 21 is used as replacement of the operating apparatus 20, the operating apparatus 21 is set such that the use of the setting data stored in the recording medium 30 is required.

In such case, the operating apparatus 21 may accept the operation request received from the communication apparatus 10 only when the setting data stored in the recording medium 30 is available. For example, the operating apparatus 21 connects with the wireless network of FIG. 3B only when the setting data stored in the recording medium 30 is available. When the setting data stored in the recording medium 30 is not available, the operating apparatus 21 does not connect with the wireless network of FIG. 3B, thus preventing the operating apparatus 21 from connecting with a network that the operating apparatus 21 is previously connected or creating a network topology apart from the user's intension. This may further prevent the operating apparatus 21 from causing an error in connecting with the wireless network of FIG. 3B, as the network setting data stored in the operating apparatus 21 may not be suitable to the communication with the communication apparatus 10.

Further, in this example, the user may select the value of the medium use setting data stored in the operating apparatus 21, for example, depending on the situation that the user faces. For example, when the operating apparatus 20 needs to be promptly replaced, the user may set the medium use setting data such that the use of the setting data stored in the recording medium 30 is required. In another example, when the operating apparatus 20 does not need to be replaced soon, the user may set the medium use setting data such that the use of the setting data stored in the recording medium 30 is not required. When the use of the setting data stored in the recording medium 30 is not required, it is not necessary to provide the recording medium 30, thus reducing the overall cost of the communication system. In another example, the user may set the medium use setting data such that the use of the setting data stored in the recording medium 30 is preferable such that the operating apparatus 21 uses the setting data stored in the recording medium 30 only when the setting data is available.

In another example, the operating apparatus 21 may additionally store medium use setting data, which requires the operating apparatus 21 to store setting data onto the recording medium 30. For example, the operating apparatus 21 may allow a user to change the setting data, and overwrite the setting data stored in either one of the recording medium 30 and the internal memory 22. When the setting data is not writable onto the recording medium 30, the operating apparatus 21 may not accept an operation request received from the outside. In this manner, the operating apparatus 21 is prevented from connecting to the network in a manner different from the user's intention. Further, when the setting data is not writable onto the recording medium 30, the operating apparatus 21 may be prohibited from writing the setting data stored in the recording medium 30 and the internal memory 22. In this manner, the setting data stored in the recording medium 30 and the setting data stored in the internal memory 22 are kept equal from each other.

Figure 4:
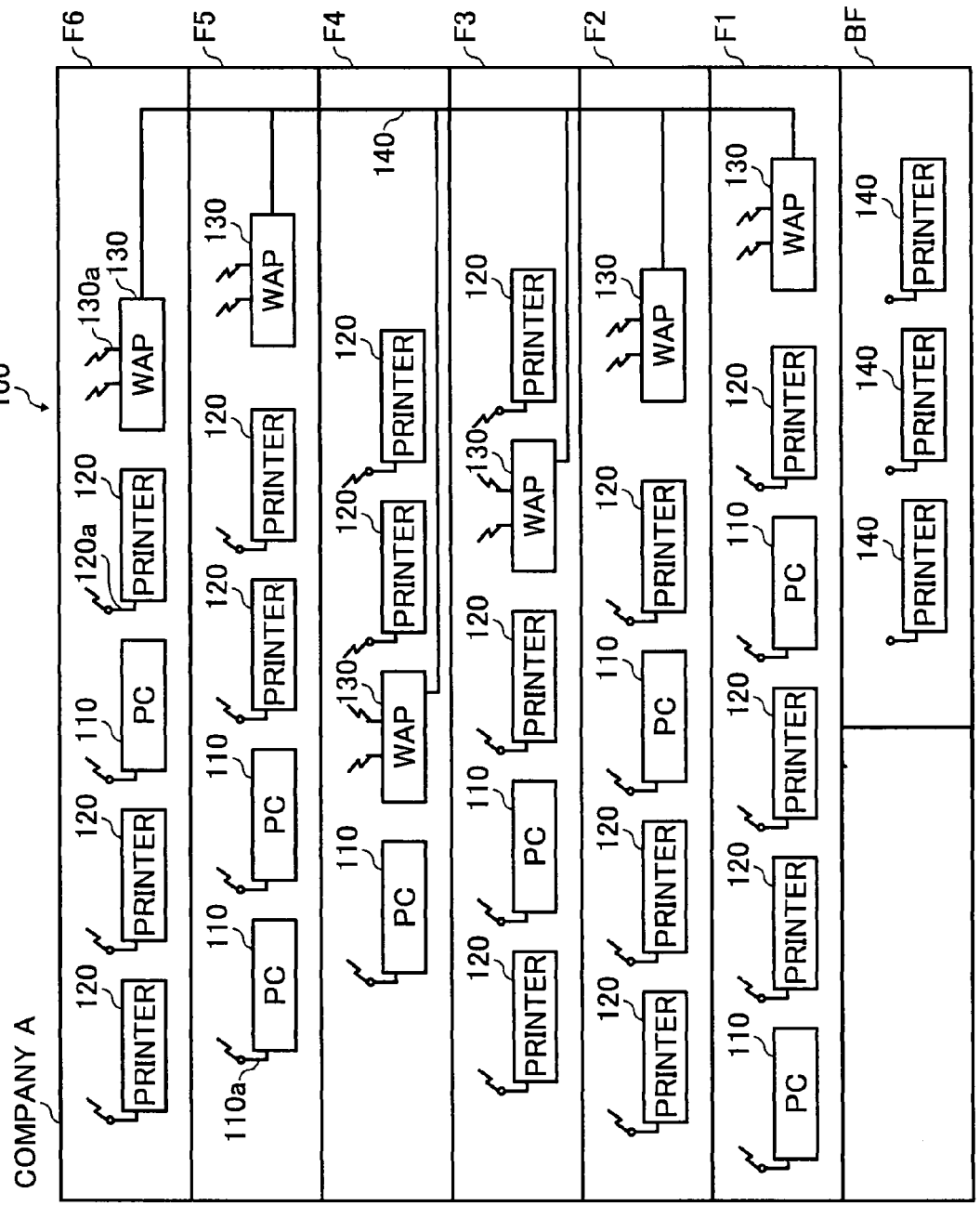
FIG. 4 is a schematic block diagram illustrating a printing system according to an example embodiment of the present invention.

The communication system shown in FIG. 1 may be implemented in various ways, for example, as a printing system 100 shown in FIG. 4. FIG. 4 illustrates a schematic block diagram illustrating a structure of the printing system 100, which is located in a building of the Company A. In FIG. 4, F1 to F6 respectively refer to the first floor to the sixth floor, while BF refers to the basement of the building. The printing system 100 includes a plurality of personal computers (PC) 110 each provided with a wireless antenna 110a, a plurality of printers 120 each provided with a wireless antenna 120a, and a plurality of WAP devices 130 each provided with a wireless antenna 130a. The number of antennas may not be limited to one as illustrated in FIG. 4. As shown in FIG. 4, the WAP device 130 is provided for each one of the first to sixth floors F1 to F6 such that, on each floor, the PCs 110 and the printers 120 communicate through the WAP device 130 to create a wireless LAN. In this example, the WAP device 130 may function as a router. Further, the WAP devices 130 are each connected with the Intranet 140 such that the WAP device 130 provided on one floor may communicate with the WAP device 130 provided on another floor through the Intranet 140 to allow communication between different floors. Alternatively, the Intranet 140 may be additionally provided with a firewall to restrict communication across the different floors. Alternatively, the Intranet 140 may be implemented by a wireless network. In addition to the printers 120 provided on each floor, a plurality of printers 140 may be provided in the basement BF, for example, in the Company A's storage room. The printer 140 may be used as replacement of the printer 120 when the printer 120 does not operate normally. For this purpose, the printer 140 may be substantially similar in structure to the printer 120. In this example, the number of the printers 140 is set about one tenth of the number of the printers 120.

In the printing system 100, the PC 110, which operates as a host apparatus to the printer 120, may function as the communication apparatus 10 of FIG. 1, for example, by sending an operation request to the printer 120 based on a user instruction or an instruction received from the outside. A printer server may be additionally provided between the PC 110 and the printer 120, which manages the operation request received from the PC 110. In this example, the operation request may be a request for printing print data ("printing request"), which may be generated by a corresponding program installed on the PC 110 using a printer language. For example, the operation request may include information regarding print data to be printed, and information regarding the printer 120 for performing the operation request such as the IP address of the printer 120. The operation request may be sent from the PC 110 to the printer 120 using a desired protocol, such as Transmission Control Protocol/Internet Protocol (TCP/IP), Line Printer daemon protocol (LPR), HTTP, port 9100, etc. Further, the operation request may be generated using the SOAP.

The printer 120 may function as the operating apparatus 20 of FIG. 1, for example, by performing operation in response to the operation request received from the PC 110. When the operation is completed, the printer 120 may send notification to the PC 110. For example, upon receiving the printing request from the PC 110, the printer 120 may perform printing as requested by the printing request, and send notification to the PC 110.

Referring now to FIG. 5, an example hardware structure of the printer 120 is explained. The printer 120 includes a CPU 211, a ROM 212, a RAM 213, an involatile memory 214, a wireless communication I/F 215, a recording medium I/F 216, an operation panel 217, and a printer engine 218, which are connected via a system bus 219. The CPU 211, ROM 212, RAM 213, involatile memory 214, wireless communication I/F 215, and recording medium I/F 216 are substantially similar in function to the CPU 201, ROM 202, RAM 203, involatile memory 204, wireless communication I/F 205, and recording medium I/F 206 of the operating apparatus 20 shown in FIG. 2. In this example, the recording medium I/F 216 may include two slots, one provided at the right side of the printer 120 ("the right slot"), and the other provided at the left side of the printer 120 ("the left slot"). The recording medium, such as a SD card 150 (FIG. 6), may be inserted into any one of the slots.

The operation panel 217 may include an input device that allows the user to input various information, such as information regarding the setting of the printer 120, using a key or a button. The operation panel 217 may further include a display device capable of displaying various information to the user, such as information indicating the setting of the printer 120. For example, referring to FIG. 16 or 18, the operation panel 217 may include a plurality of buttons that correspond to the input device, and a display 221 that corresponds to the display device.

The printer engine 128 may perform image forming using any desired image forming method, such as the electrographic method, inkjet method, or heat transfer method.

Figure 6:
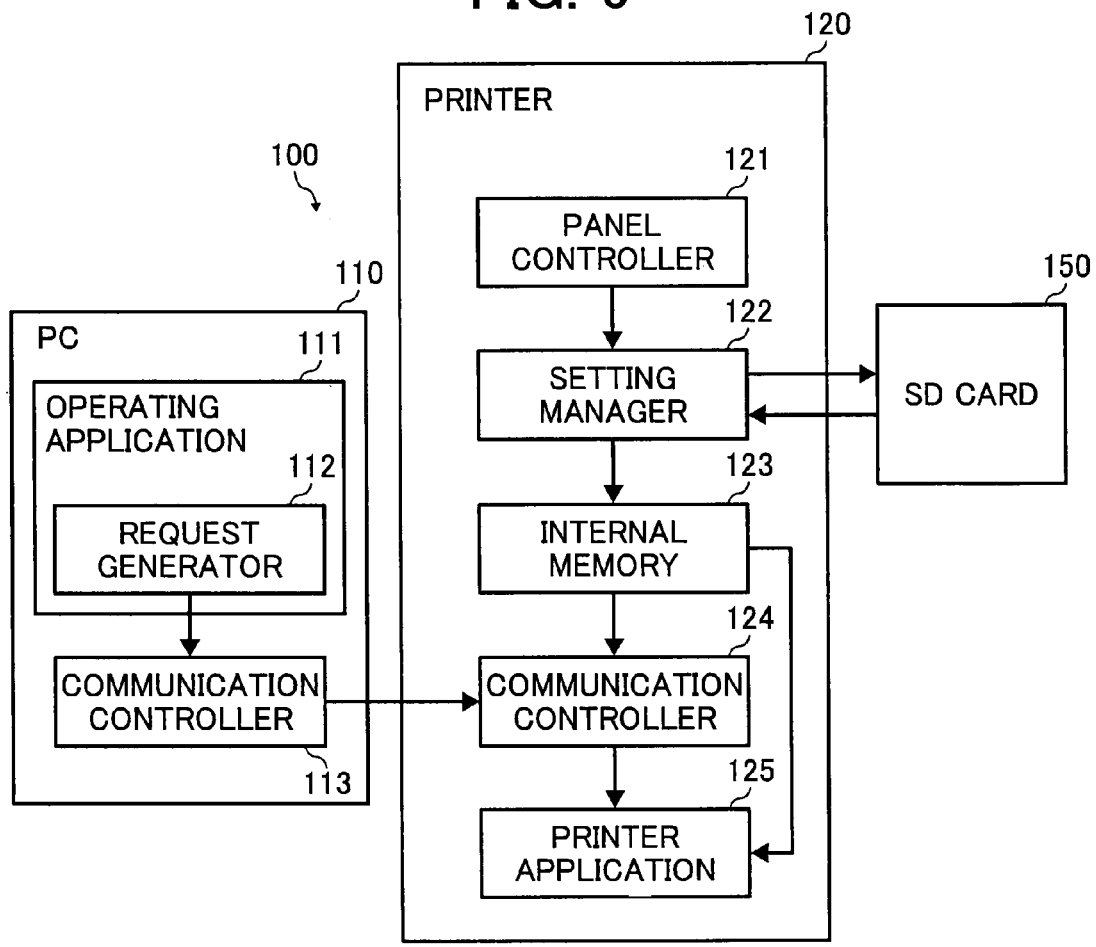
FIG. 6 is a schematic block diagram illustrating a functional structure of the printer and a personal computer shown in FIG. 4.

Referring to FIG. 6, a functional structure of each one of the PC 110 and the printer 120 is explained according to an example embodiment of the present invention.

The PC 110 includes an operating application 111 and a communication controller 113. The operating application 111 may be implemented by any kind of application program run on the PC 110, including, for example, an accounting program, spreadsheet program, database program, sales management program, word processing program, drawing program, image processing program, etc. The operating application 111 may include a request generating program, which may function as a request generator 112 capable of generating an operation request such as a printing request that requests the printer 120 to print data. The request generating function may be performed partially or entirely by a program other than the operating application 111, such as a printer driver. The communication controller 113 controls communication between the PC 110 and the outside apparatus. For example, the communication controller 113 may send the operation request generated by the request generator 112 through the WAP device 130 to the printer 120.

Figure 11:
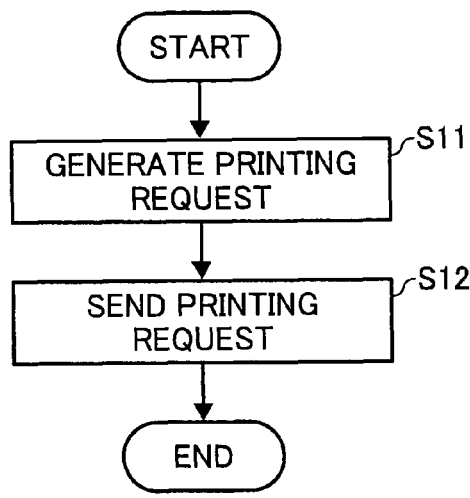
FIG. 11 is a flowchart illustrating operation of generating and sending a printing request, performed by the personal computer shown in FIG. 4, according to an example embodiment of the present invention.

For example, the PC 110 generates and sends a printing request to the WAP device 130, as illustrated in FIG. 11. The operation of FIG. 11 may be performed by the processor, such as the CPU, of the PC 110 upon receiving a user instruction.

S11 generates a printing request, for example, using a printing language.

S12 sends the printing request to the WAP device 130, and the operation ends. At this time, the IP address of the printer 120 is included in the printing request to identify the printer 120 that should receive the operation request.

Referring back to FIG. 6, the printer 120 includes a panel controller 121, a setting manager 122, an internal memory 123, a communication controller 124, and a printer application 125.

The panel controller 121 controls the operation panel 217, for example, by inputting various information input by the user through the operation panel 217, or outputting various information to be output to the operation panel 217.

The setting manager 122 manages setting data to be used by the printer 120. For example, the setting manager 122 reads out setting data from the SD card 150, which is inserted into the slot of the printer 120, and stores the setting data in the internal memory 123 to cause the printer 120 to operate according to the setting data. Alternatively, the setting manager 122 may change the setting data stored in the internal memory 123 according to information input by the panel controller 121. Alternatively, the setting manager 122 may write the setting data stored in the internal memory 123 onto the SD card 150. In this example, items of the setting data stored in the internal memory 123 and items of the setting data stored in the SD card 150 are preferably made equal from each other. Specific items to be stored onto or read from the SD card 150 or the internal memory 123 may be determined by default according to the firmware or the hardware structure of the printer 120, or according to the user preference.

The internal memory 123 may be implemented by any desired memory capable of storing the setting data to be used by the printer 120. In this example, the internal memory 123 may correspond to the involatile memory 214 (FIG. 5). For example, the internal memory 123 may store medium use setting data that requires the printer 120 to use the setting data stored in the SD card 150 when preparing for communication with the PC 110. When the medium use setting data indicates the use of the setting data stored in the SD card 150 is required and when the setting data stored in the SD card 150 is not available, the operation request received from the outside may not be accepted by the printer 120. Alternatively or additionally, when the medium use setting data indicates storing the setting data in the SD card 150 is required, and when the setting data is not writable to the SD card 150, the operation request received from the outside may not be accepted by the printer 120.

In this example, the setting data to be stored in the internal memory 123 may correspond to any one of the items shown in any one of the tables T1 to T4 shown in FIGS. 7 to 10.

Referring to the table T1 shown in FIG. 7, the setting data may correspond to any item of information to be used for communication via a network, including, dynamic host configuration protocol (DHCP), IP address, subnet mask, gateway address, valid protocol, and/or communication speed. When the PC 110 sends the operation request to the printer 120 using the TCP/IP protocol, at least the IP address is preferably stored.

Referring to the table T2 shown in FIG. 8, the setting data may correspond to any item of information to be used for communication via a wireless network, including, SSID, encryption method, option, and/or network key. When the printer 120 connects with the wireless network through the WAP device 130, at least the SSID, which is the same as the SSID of the WAP device 130, is preferably specified.

The "encryption method" item specifies an encryption method to be used for communication between the printer 120 and the WAP device 130. In this example, the encryption method may be selected from the Wired Equivalent Privacy (WEP), Wi-Fi Protected Access (WPA), and no encryption. The "option" item specifies an option available to the encryption method selected for use. For example, when the WPA is selected as the encryption method, the option may be selected from the Advanced Encryption Standard (AES) and the Temporal Key Integrity Protocol (TKIP). The "network key" item corresponds to a key used for encryption using the encryption method selected for use. For example, when the WPA is selected as the encryption method, a WPA key may be automatically selected. When the WEP is selected as the encryption method, a WEP key may be automatically selected.

For the descriptive purpose, the items of information stored in the tables T1 and T2 may be collectively referred to as the network setting data. The network setting data may be preferably read out from the SD card 150.

Referring to the table T3 shown in FIG. 9, the setting data may correspond to information regarding the use of the SD card 150, which may be inserted into the slot of the printer 120. The "SD card use" item indicates whether to firstly access the SD card 150 to search for setting data. The "SD card required" item indicates whether to require the printer 120 to use the SD card 150 when reading or writing setting data. The "slot" item indicates the slot to be used for reading or writing setting data. For the descriptive purpose, the items of information stored in the table T3 may be collectively referred to as the medium use setting data. The medium use setting data may be previously stored in the internal memory 123.

Referring to the table T4 shown in FIG. 10, the setting data may correspond to any information regarding printing operation, including, for example, a form to be used for printing, a font to be used for printing, a sheet tray storing a recording sheet to be used for printing, an emulation program to be executed when printing, a type of the recording sheet to be used for printing, etc. For the descriptive purpose, the items of information stored in the table T4 may be collectively referred to as the operation setting data. The operation setting data may be previously stored in any one of the internal memory 123 and the SD card 150.

In addition to the above-described items, any other item may be stored as the setting data, including, for example, an external character table.

Referring back to FIG. 6, the communication controller 124 allows the printer 120 to communicate with the outside apparatus such as the PC 110 through the WAP device 130, using the network setting data stored in the internal memory 123. For example, the communication controller 124 may receive the operation request sent by the PC 110, and send the operation request to the printer application 125.

When the medium use setting data, which may be stored in the internal memory 123, indicates that the use of the setting data stored in the SD card 150 is required, and when the setting data stored in the SD card 150 is not available, the communication controller 124 does not accept the operation request received from the outside. When the setting data stored in the SD card 150 is available, the communication controller 124 accepts the operation request received from the outside. In such case, the internal memory 123 stores the network setting data, such as the IP address of the printer 120 and the SSID of the WAP device 130, read out from the SD card 150.

The printer application 125 causes the printer engine 218 (FIG. 5) to perform printing operation requested by the operation request, according to the setting data stored in the internal memory 123 such as the operation setting data.

Figure 12:
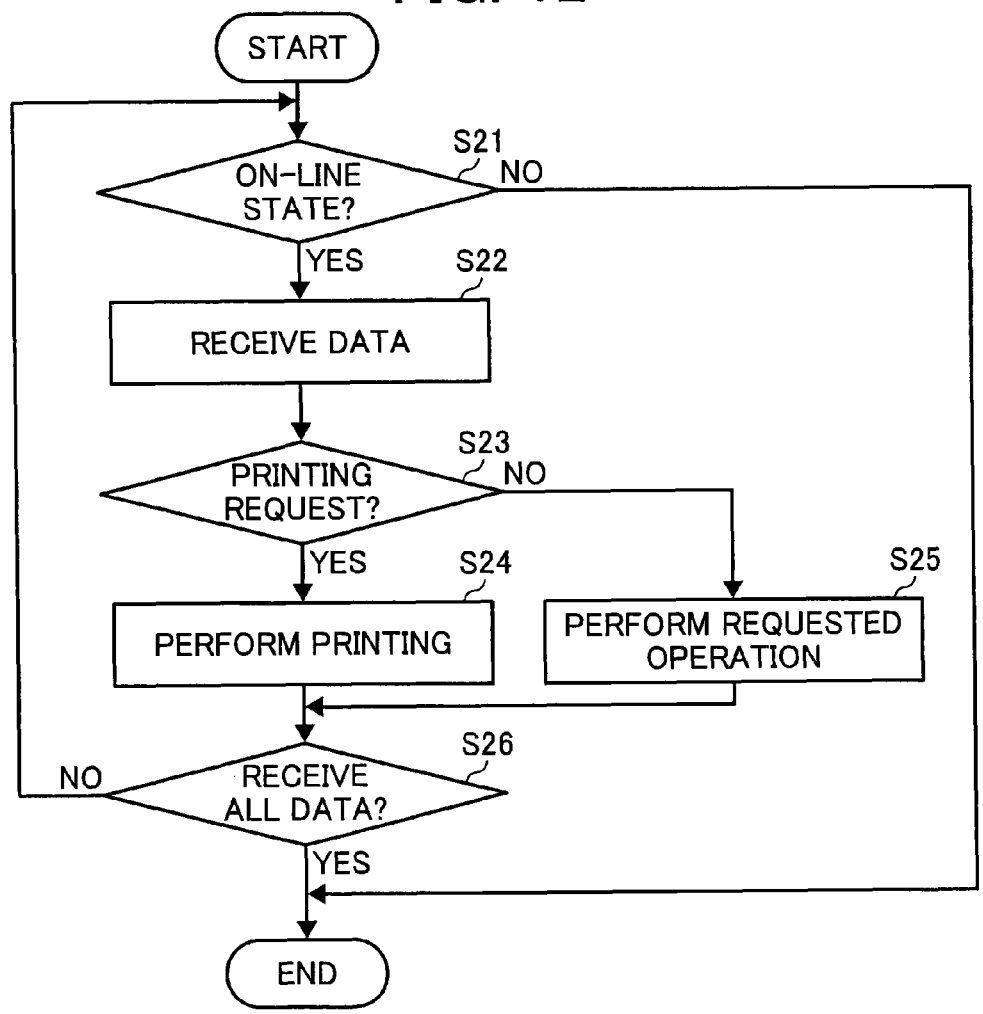
FIG. 12 is a flowchart illustrating operation of performing operation according to data received from the outside, performed by the printer shown in FIG. 4, according to an example embodiment of the present invention.

In operation, the printer 120 receives data sent by the PC 110 through the WAP device 130, and performs operation according to the received data, for example, as illustrated in FIG. 12. The operation of FIG. 12 may be performed by the CPU 211 of the printer 120 upon receiving the data from the wireless network through the wireless communication I/F 215.

S21 determines whether the printer 120 is in the on-line state, which is the state in which the data, such as the operation request, can be received from the outside. If it is determined that the printer 120 is in the on-line state ("YES" at S21), the operation proceeds to S22. If it is determined that the printer 120 is in the off-line state ("NO" at S21), the operation ends. When the printer 120 is in the off-line state, the printer 120 ends the operation without sending any notification to the PC 110.

S22 receives the data sent from the outside.

S23 determines whether the data received at S22 corresponds to a printing request. If the data received at S22 corresponds to the printing request ("YES" at S23), the operation proceeds to S24. If the data received at S22 does not correspond to the printing request ("NO" at S23), the operation proceeds to S25. S21 to S23 may be performed by the communication controller 124 (FIG. 6) under control of the CPU 211.

S24 performs printing as requested by the printing request. For example, the communication controller 124 may send the printing request to the printer application 125 to cause the printer application 125 to perform printing.

S25 performs operation according to the data received at S23. At this time, if an error is detected, an error message may be generated.

S26 determines whether all data is received. When it is determined that all data is received ("YES" at S26), the operation ends. When it is determined that all data is not received ("NO" at S26), the operation returns to S21 to wait for other data.

As described above referring to FIG. 12, when the printer 120 is in the on-line state, i.e., when the printer 120 is connected to the wireless network, the printer 120 is capable of receiving an operation request from the PC 110 through the WAP device 130. When the printer 120 is in the off-line state, i.e., when the printer 120 is not connected to the wireless network, the printer 120 does not receive an operation request from the PC 110 through the WAP device 130.

As described above referring to FIGS. 11 and 12, the printer 140 may easily replace the printer 120 when an error is detected in the printer 120, without requiring the change in setting of any one of the PC 110, WAP device 130, and printer 140. Referring to FIG. 11, since the printing request identifies the printer 120 using the IP address, the printer 140 is capable of receiving the printing request originally addressed to the printer 120 as long as the printer 140 can obtain the IP address identical to the IP address used by the printer 120, from the SD card 150. Thus, it is not necessary to change information contained in the printing request. Referring to FIG. 12, the printer 140 becomes the on-line state only when the IP address is readable from the SD card 150. When the IP address is not readable, the printer 140 does not accept data sent by the PC 110, for example, by keeping the printer 140 disconnected from the wireless network.

Further, the printer 140 becomes the on-line state only when the SSID used by the printer 120 is readable from the SD card 150. Using the SSID, the printer 140 may identify the WAP device 130 that the printer 140 needs to connect in order to receive the printing request sent from the PC 110. At this time, the printer 140 may further read information regarding the encryption method or key used by the printer 120, if such setting data is stored in the SD card 150. Thus, it is not necessary to change the setting of the WAP device 130 or the printer 140.

Figure 13B:
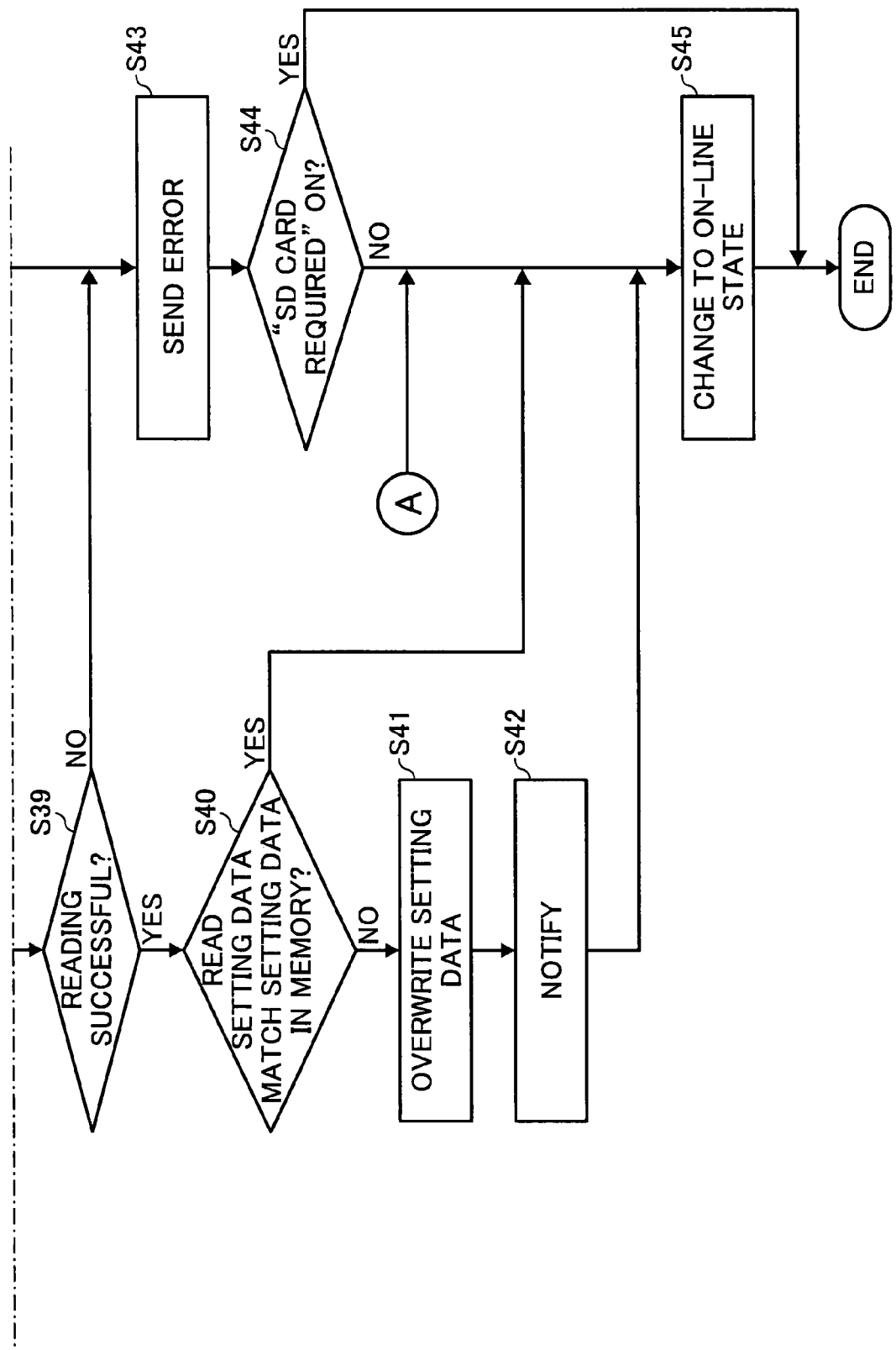
FIG. 13 is a flowchart illustrating operation of determining the on-line state of the printer shown in FIG. 4, according to an example embodiment of the present invention.

As described above referring to FIGS. 11 and 12, the on-line or off-line state of the printer 120 or 140 may be determined by the availability of the setting data stored in the recording medium 30. Referring now to FIG. 13, operation of determining the on-line state of the printer 120 or 140, is explained according to an example embodiment of the present invention. The operation of FIG. 13 may be performed by the CPU 211 upon activation of the printer 120 or 140, such as when the power supply is turned on or the system is restarted.

S31 performs initialization processing.

S32 determines whether to use the setting data stored in the SD card 150, by referring to the medium use setting data that may be stored in the internal memory 123. For example, the CPU 211 may refer to the "SD card use" item of the table T3 shown in FIG. 9. When the "SD card use" item is "ON", the CPU 211 determines to use the setting data stored in the SD card 150, and the operation proceeds to S33 to S37 to determine the SD card 150 for access. When the "SD card use" item is "OFF", the CPU 211 determines not to use the setting data stored in the SD card 150, and the operation proceeds to S45 to make the printer 120 or 140 the on-line state using the setting data stored in the internal memory 123.

S33 determines whether the "slot" item of the table T3 shown in FIG. 9 is set "AUTO". When the "slot" item is set "AUTO" ("YES" at S33), the operation proceeds to S34. Otherwise ("NO" at S33), the operation proceeds to S36.

S34 determines whether only one SD card 150 is provided to the printer 120 or 140. When only one SD card 150 is available for access ("YES" at S34), the operation proceeds to S35 to determine to access the SD card 150 being inserted. When more than one SD card 150 is available for access ("NO" at S34), the operation proceeds to S43 to generate an error message. At this time, the printer 120 or 140 may request the user to select one of the slots for access.

When the "slot" item is either set to "LEFT" or "RIGHT" at S33, the operation proceeds to S36 to determine whether the selected slot is provided with the SD card 150. When the SD card 150 is available for access ("YES" at S36), the operation proceeds to S37 to determine to access the SD card 150 being inserted into the selected slot. When the SD card 150 is not available for access ("NO" at S36), the operation proceeds to S43 to generate an error message. At this time, the printer 120 or 140 may request the user to re-select one of the slots for access, or insert the SD card 150 into the selected slot.

After the SD card 150 to be used is determined, S38 reads out the setting data stored in the selected SD card 150.

S39 determines whether reading is successfully completed. When reading is successfully completed ("YES" at S39), the operation proceeds to S40. When an error is detected during reading ("NO" at S39), the operation proceeds to S43 to generate an error message to notify the user. At this time, the printer 121 may provide a plurality of options.

S40 determines whether the setting data read from the SD card 150 matches the setting data stored in the internal memory 123. When it is determined that the setting data match ("YES" at S40), the operation proceeds to S45. When it is determined that the setting data do not mach ("NO" at S40), the operation proceeds to S41 to overwrite the setting data stored in the internal memory 123 with the setting data read from the SD card 150.

S42 notifies the user that the setting data has been updated, for example, by outputting information shown in FIG. 14. Referring to FIG. 14, the items that are updated are boxed. The information of FIG. 14 may be printed as printed paper, or displayed on the operation panel 217.

S45 connects the printer 120 or 140 to the wired network using the setting data stored in the internal memory 123 to make the printer 120 or 140 the on-line state, and the operation ends.

When the SD card 150 is not determined at S33 to S37, or when reading from the SD card 150 fails at S39, at S43, the CPU 211 notifies the user that the error is generated, for example, by printing the error message or displaying the error message. After notification, S44 determines whether the medium use setting data indicates that the use of the setting data stored in the SD card 150 is required, for example, by referring to the "SD card required" item stored in the table T3 shown in FIG. 9. When the "SD card required" item indicates that the use of the SD card 150 is required ("YES" at S44), the operation ends while keeping the off-line state of the printer 120 or 140. When the "SD card required" item indicates that the use of the SD card 150 is not required ("NO" at S44), the operation proceeds to S45 to make the printer 120 or 140 the on-line state using the setting data stored in the internal memory 123.

As described above, the printer 120 or 140 may operate differently according to the medium use setting data, which may be stored in the internal memory 123. In one example, when the medium use setting data indicates not to use the SD card 150, i.e., the "SD card use" item is "OFF", the printer 120 or 140 prepares for communication using the setting data stored in the internal memory 123. The medium use setting data of this type may be preferably set for the printer 120, or the printer 140 when it is certain that the printer 140 is not used as replacement of the printer 120.

In another example, when the medium use setting data indicates to use the SD card 150, i.e., the "SD card use" item is "ON", the printer 120 or 140 prepares for communication using the setting data read out from the SD card 150 when the SD card 150 is readable. When the SD card 150 is not readable, the printer 120 or 140 may prepare for communication using the setting data stored in the internal memory 123. The medium use setting data of this type may be preferably set for the printer 120, or the printer 140 when it is not certain that the printer 140 is used as replacement of the printer 120. This setting does not require the use of the SD card 150. Further, this setting may be preferable when the setting data of the printer 120 or 140 is manually set using the operation panel 217.

In another example, when the medium use setting data indicates to require the use of the SD card 150, i.e., the "SD card required" item is "ON", the printer 120 or 140 remains disconnected from the network when the SD card 150 is not readable. The medium use setting data of this type may be preferably set for the printer 140 when it is certain that the printer 140 is used as replacement of the printer 120. This may prevent the printer 140 from connecting to the network using the setting data different from the setting data of the printer 120, thus suppressing the occurrence of an error.

The operation of FIG. 13 may be performed in various other ways. For example, when determining the SD card 150 for access, the CPU 211 may search through more than one SD cards for specific items of the setting data, such as the IP address and the SSID. Based on the search result, the CPU 211 may determine the SD card for access. In addition to the IP address and the SSID, the operation setting data such as information stored in the table T4 shown in FIG. 10 may be read out from the SD card 150.

Figure 15B:
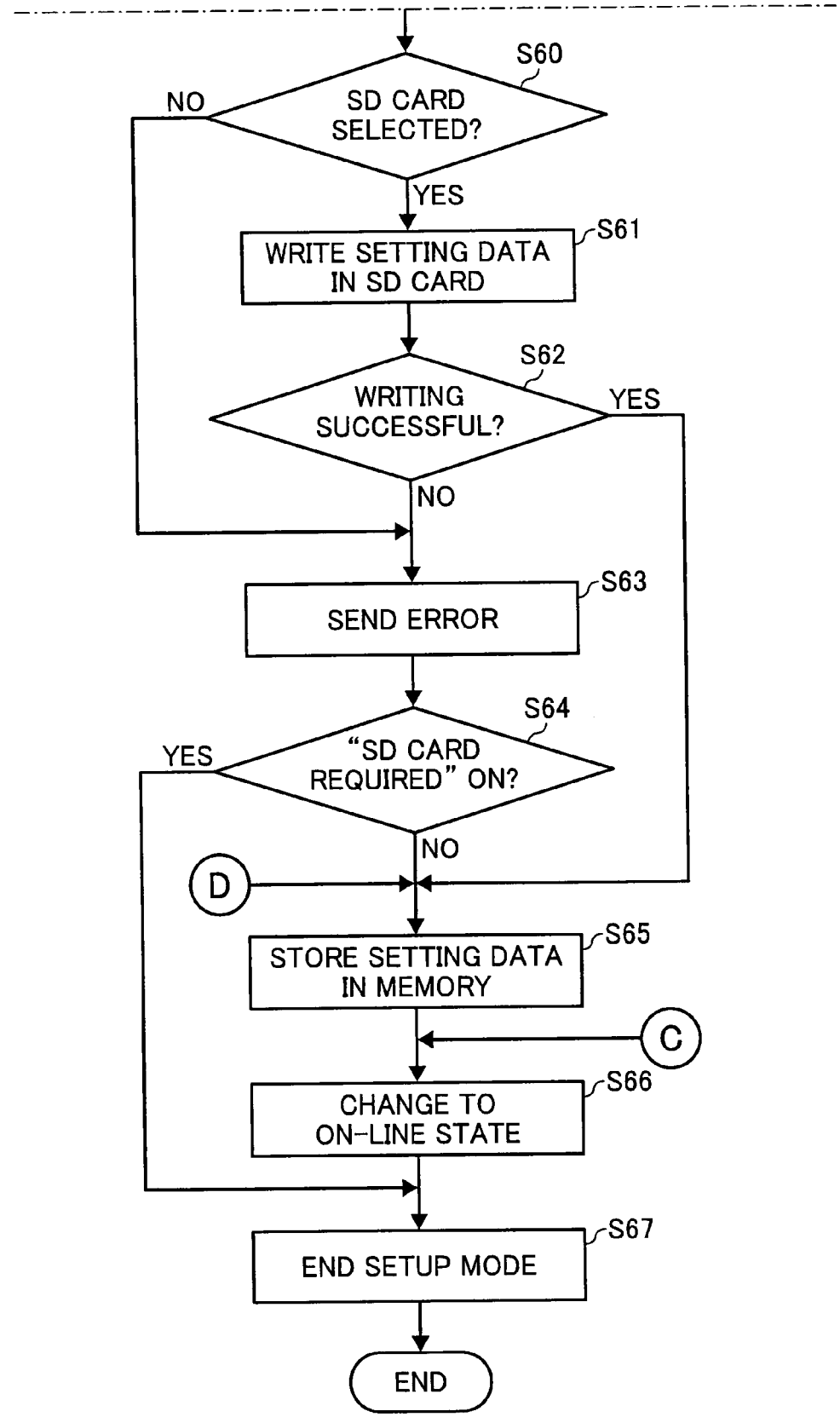
FIG. 15 is a flowchart illustrating operation of changing setting data, performed by the printer shown in FIG. 4, according to an example embodiment of the present invention.

Referring now to FIG. 15, operation of changing the setting data stored in the internal memory 123, performed by the printer 120 or 140, is explained according to an example embodiment of the present invention. The operation of FIG. 15 may be performed by the CPU 211 upon receiving a user instruction for changing the setting data stored in the internal memory 123, for example, through the operation panel 217. The setting data may correspond to network setting data or operation setting data.

S51 determines whether the user requesting for change is authorized to change the setting data, for example, by checking the password input by the user or the IC card provided by the user.

S52 determines whether the user is authorized to change the setting data. When the user is authorized to change the setting data ("YES" at S52), the operation proceeds to S53. When the user is not authorized to change the setting data ("NO" at S52), the operation returns to S51. Alternatively, the operation may end.

S53 disconnects the printer 120 or 140 from the network to make the printer 120 or 140 the off-line state. The CPU 211 then switches to a setup mode, and displays a setup screen on the operation panel 217. Using the setup screen, the user may change the setting data by inputting updated setting data, and presses a confirmation button, such as the "OK" button 222 (FIG. 16), to complete inputting operation.

When it is determined that the inputting operation is completed at S53, the operation proceeds to S55 to determine whether the setting data has been changed. When it is determined that the setting data has been changed ("YES" at S55), the operation proceeds to S56. When it is determined that the setting data has not been changed ("NO" at S55), the operation proceeds to S66 to connect the printer 120 or 140 to the network without overwriting the setting data stored in the internal memory 123.

Figure 16:
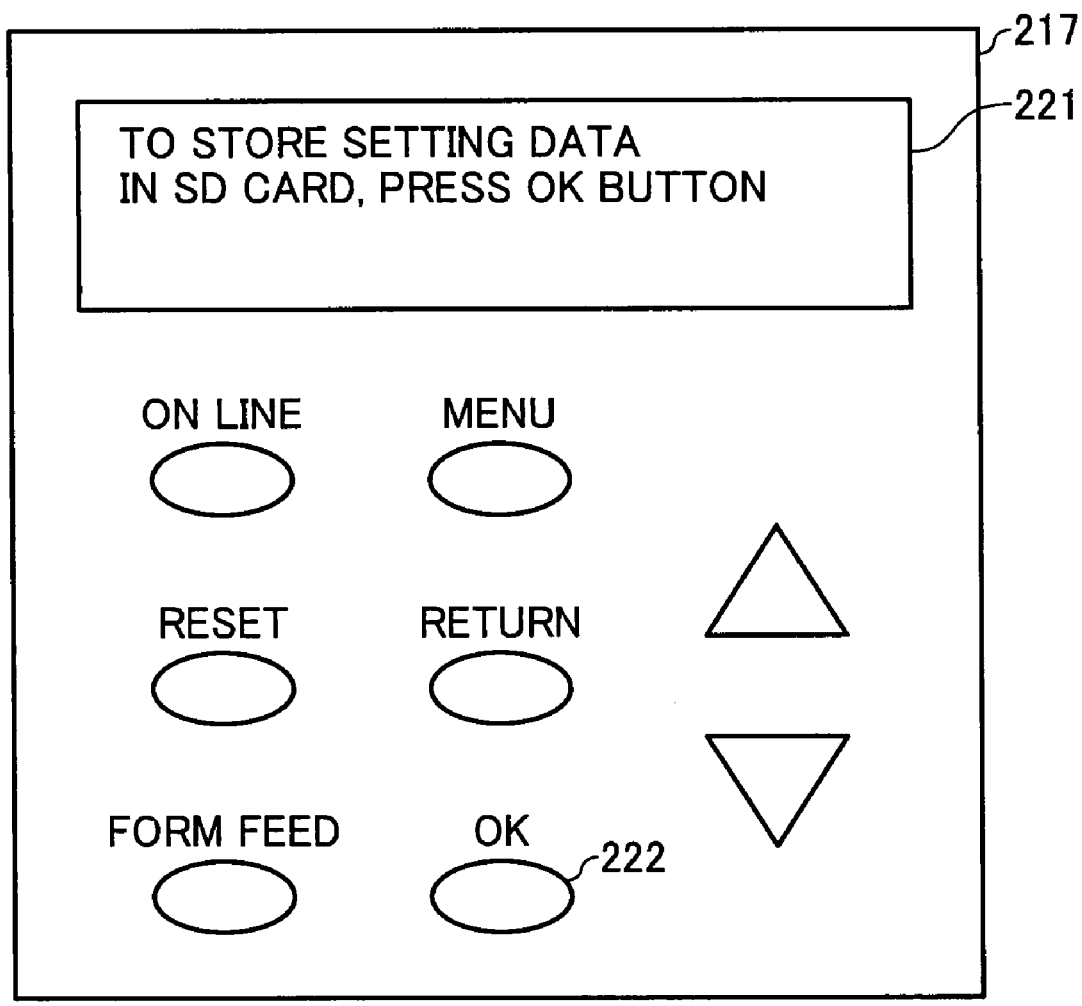
FIG. 16 is an example setup screen, displayed by the printer shown in FIG. 4, when performing the operation of FIG. 15.

S56 requests the user to confirm the change made to the setting data, for example, by displaying a confirmation screen shown in FIG. 16. Referring to FIG. 16, the confirmation screen is displayed on the display 221 of the operation panel 217. In addition to the display 221, the operation panel 217 may be provided with the plurality of buttons including the "OK" button 222. When the "OK" button 222 is pressed, the CPU 211 determines that the change made to the setting data is confirmed. For example, referring back to FIG. 15, S57 determines whether the "OK" button 222 is pressed. When the "OK" button 222 is pressed ("YES" at S57), the operation proceeds to S58. When the "OK" button 222 is not pressed or any other button provided in the operation panel 217 is pressed ("NO" at S57), the operation proceeds to S66 to connect the printer 120 or 140 with the network without overwriting the setting data stored in the internal memory 123. In alternative to proceeding to S66, the CPU 211 may perform operation according to the button pressed at S57.

S58 determines whether the "SD card use" item is set "ON". When the "SD card use" item is set "ON" ("YES" at S58), the operation proceeds to S59 to determine the SD card 150 for access. In this example, S59 of determining the SD card 150 for access may be performed in a substantially similar manner as described above referring to S33 to S37 of FIG. 13. When the "SD card use" item is set "OFF" ("NO" at S58), the operation proceeds to S65 to store the updated setting data only in the internal memory 123.

S60 determines whether the SD card 150 for access is determined at S59. When the SD card 150 is not determined ("NO" at S60), the operation proceeds to S63 to generate an error message. When the SD card 150 is determined ("YES" at S60), the operation proceeds to S61 to overwrite the setting data stored in the SD card 150 with the setting data that has been input by the user. In this example, the setting data to be overwritten may correspond to the items of the setting data to be read out from the SD card 150, such as information regarding the IP address and the SSID.

S62 determines whether writing is successfully completed. When it is determined that writing is successfully completed ("YES" at S62), the operation proceeds to S65. When it is determined that an error is detected during writing ("NO" at S62), the operation proceeds to S63 to generate an error message.

S65 stores the setting data, that has been changed, in the internal memory 123. S66 connects the printer 120 or 140 to the network to make the printer 120 or 140 the on-line state. S67 ends the setup mode, and the operation ends.

When the SD card 150 is not determined at S60 or when the SD card 150 is not writable at S62, the operation proceeds to S63 to notify the user that an error is generated, and further to S64 to determine whether the medium use setting data indicates the use of the SD card 150 is required. When the use of the SD card 150 is required ("YES" at S64), i.e., when the "SD card required" item is "ON", the operation proceeds to S67 to end the setup mode without storing the setting data. When the use of the SD card 150 is not required ("NO" at S64), i.e., when the "SD card required" item is "OFF", the operation proceeds to S65 to sore the setting data in the internal memory 123.

As described above referring to FIG. 15, the printer 120 or 140 may operate differently according to the medium use setting data, which may be stored in the internal memory 123. In one example, when the medium use setting data indicates not to use the SD card 150, i.e., the "SD card use" item is "OFF", the printer 120 or 140 may overwrite the setting data stored in the internal memory 123. The medium use setting data of this type may be preferably set for the printer 120, or the printer 140 when it is certain that the printer 140 is not used as replacement of the printer 120.

In another example, when the medium use setting data indicates to use the SD card 150, i.e., the "SD card use" item is "ON", the printer 120 or 140 may overwrite the setting data stored in the SD card 150 when the SD card 150 is available. When the SD card 150 is not available, the printer 120 or 140 may overwrite the setting data stored in the internal memory 123. The medium use setting data of this type may be preferably set for the printer 120, or the printer 140 when it is not certain that the printer 140 is used as replacement of the printer 120. This setting does not require the use of the SD card 150. Further, this setting may be preferable when the setting data of the printer 120 or 140 is manually set using the operation panel 217, and stored in the SD card 150 for later use.

In another example, when the medium use setting data indicates to require the use of the SD card 150, i.e., the "SD card required" item is "ON", the printer 120 or 140 is prohibited from overwriting the setting data stored in the SD card 150 and the internal memory 123 when the SD card 150 is not writable. In this manner, the configuration data stored in the SD card 150 can be made identical to the configuration data stored in the internal memory 123. Further, when the SD card 150 is not writable, the printer 120 or 140 remains disconnected from the network. The medium use setting data of this type may be preferably set for the printer 140 when it is certain that the printer 140 is used as replacement of the printer 120. This may prevent the printer 140 from connecting to the network using the setting data different from the setting data input by the user, thus suppressing the occurrence of an error.

The operation of FIG. 15 may be performed in various other ways. For example, when determining the SD card 150 for access, the CPU 211 may search through more than one SD cards for specific items of the setting data, such as the IP address and the SSID. Based on the search result, the CPU 211 may determine the SD card for access. In addition to the IP address and the SSID, the operation setting data such as information stored in the table T4 shown in FIG. 10 may be stored in the SD card 150. Alternatively, the user instruction may be input through the PC 110.

Figure 17:
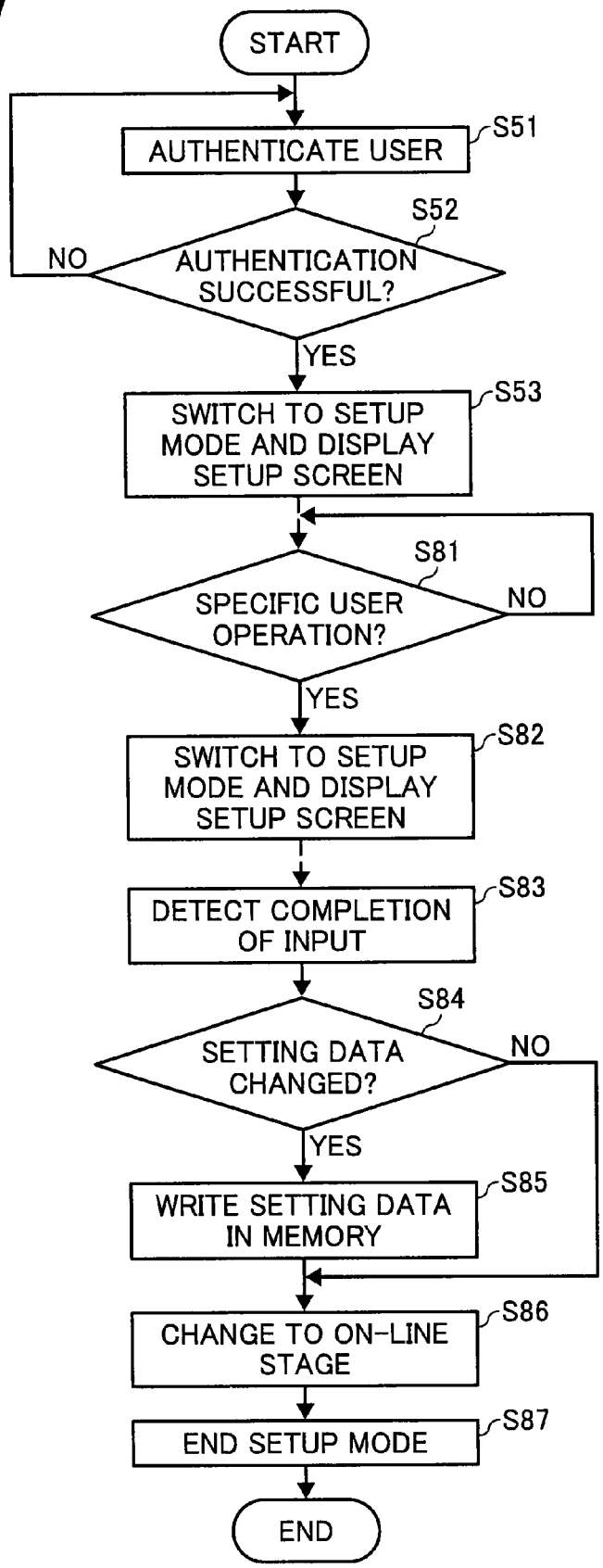
FIG. 17 is a flowchart illustrating operation of changing medium use setting data, performed by the printer shown in FIG. 4, according to an example embodiment of the present invention.

Referring now to FIG. 17, operation of changing the medium use setting data stored in the internal memory 123, performed by the printer 120 or 140, is explained according to an example embodiment of the present invention. The operation of FIG. 17 may be performed by the CPU 211 upon receiving a user instruction for changing the medium use setting data stored in the internal memory 123, for example, through the operation panel 217.

S51 to S53 of FIG. 17 may be performed in a substantially similar manner as described above referring to S51 to S53 of FIG. 15.

When the printer 120 or 140 is switched to the setup mode at S53, S81 determines whether specific user operation is performed on the operation panel 217. In this example, the specific user operation may correspond to any operation that may not be performed on the operation panel 217 during a normal operation, such as holding one or more buttons for more than a predetermined period, or pressing a plurality of buttons in an order previously determined. This specific user operation, which is previously determined, may be disclosed to a group of users who are authorized to change the medium use setting data. In this manner, the security level may increase. Alternatively, at S81, authentication of the user may be checked using any other method, such as by requiring the user to input a password or provide an IC card. When the specific user operation is performed ("YES" at S81), the operation proceeds to S82. When the specific user operation is not performed ("NO" at S81), the operation ends. Alternatively, when the specific use operation is not performed, the operation may proceed to S54 of FIG. 15 to operate in a substantially similar manner as described above referring to FIG. 15.

Figure 18:
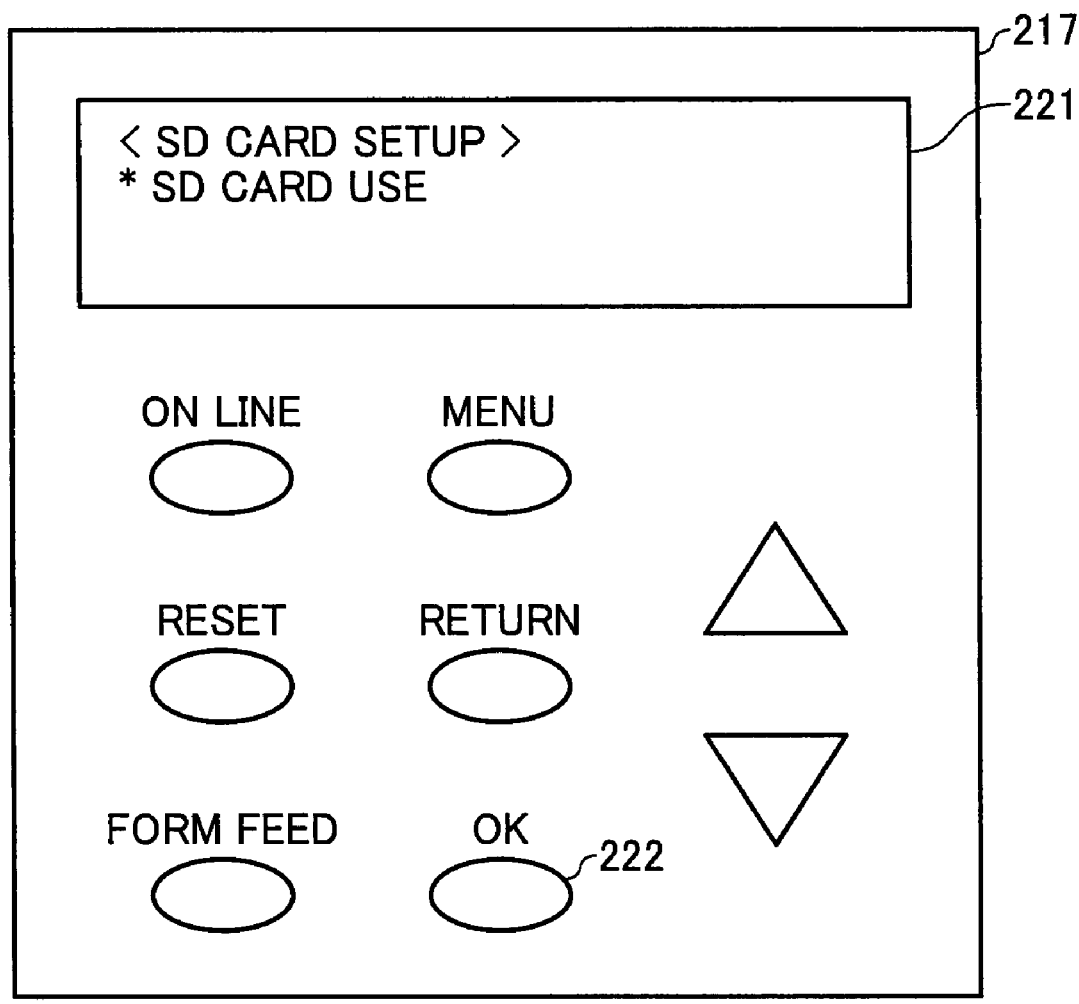
FIG. 18 is an example setup screen, displayed by the printer shown in FIG. 4, when performing the operation of FIG. 17.

S82 displays a SD card setup screen on the operation panel 217 to allow the user to change the medium use setting data, for example, a SD card setup screen shown in FIG. 18. The contents of the SD card setup screen of FIG. 18 may be changed according to the user input, for example, as illustrated in FIG. 19. In this manner, the authorized user may change any item of the medium use setting data, such as the "SD card use" item, the "SD card required" item, or the "slot" item. After changing the medium use setting data, the user presses a confirmation button, such as the "OK" button 222 to complete inputting operation.

Referring back to FIG. 17, when it is determined that the inputting operation is completed at S83, the operation proceeds to S84 to determine whether the medium use setting data been changed. When it is determined that the medium use setting data has been changed ("YES" at S84), the operation proceeds to S85 to overwrite the medium use setting data stored in the internal memory 123. S86 connects the printer 120 or 140 to the network to make the printer 120 or 140 the on-line state. S87 ends the setup mode, and the operation ends. When it is determined that the medium use setting data has not been changed ("NO" at S84), the operation proceeds to S86 to change to the on-line state without overwriting the medium use setting data.

In this example, the medium use setting data is not stored in the SD card 150, as the medium use setting data may be device-specific.

Further, as described above referring to FIG. 17, the printer 120 or 140 allows the user to change the medium use setting data only when the user is determined to be an authorized user, thus increasing the stability of the printing system 100.

Further, by making the setup mode described above referring to FIG. 17 different from the setup mode described above referring to FIG. 15, the SD card setup screen shown in FIG. 18 or 19 may not be displayed to the user who does not use the SD card 150, thus increasing the stability of the printing system 100.

The operation of FIG. 17 may be performed in various other ways. For example, the user instruction may be input through the PC 110.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

In another example, the communication apparatus 10 and the operating apparatus 20 shown in FIG. 1 may be integrally provided as one apparatus.

Further, the setting data of the operating apparatus 20 may be stored in the recording medium 30 using a general-purpose computer, as the computer is usually provided with an interface that is high in operability. In this manner, the workload of the user may be reduced.

Further, the setting data stored in the internal memory 22 may not be overwritten with the setting data read from the recording medium 30. In such case, the operating apparatus 20 may select which of the setting data for use.

Further, according to the above-described examples, when the use of the recording medium 30 is required, the operating apparatus 20 does not accept the operation request sent by the communication apparatus 10 when the recording medium 30 is not readable or writable. Additionally, when the recording medium 30 is not writable, the operating apparatus 20 does not overwrite the setting data stored in the recording medium 30 and the internal memory 22. Alternatively, the operating apparatus 20 may be set such that it performs at least one of the above-described operation of restricting the operation.

Further, the items of the setting data to be read out from the recording medium 30 may be limited to the IP address and the SSID. In such case, the operating apparatus 20 stores the IP address and the SSID in the internal memory 22, and connects to the network using the IP address and the SSID. Once the connection is established, the operating apparatus 20 may obtain one or more kinds of setting data from the network.

Further, the wireless network may be implemented in various other ways. For example, the relay device, such as the WAP device 130, may be replaced by one or more apparatuses that may function as a master node.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile recording medium such as SRAM, EEPROM, or memory card, ROM (read-only-memory), etc. The computer program may be installed on any memory provided in one of the communication apparatus 10, operation request accepting apparatus 20, PC 110, and printer 120. Alternatively, the computer program may be downloaded from the network.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An operating apparatus, comprising:
a communication interface configured to receive an operation request from a wireless network, the operation request specifying a destination operating apparatus configured to perform an operation requested by the operation request;
a memory configured to store a first network setting data comprising destination identification information for uniquely identifying the operating apparatus, and to store a medium use setting data, wherein the medium use setting data comprises data indicating whether the operating apparatus is required to access a removable recording medium to search for setting data stored therein, and data indicating whether the operating apparatus is required to use setting data stored in the removable recording medium;
a medium interface configured to read a second network setting data stored in a removable recording medium, the second network setting data comprising destination identification information to be used for uniquely identifying the destination operating apparatus specified by the operation request and wireless identification information for uniquely identifying the wireless network to which the destination operating apparatus belongs; and
a processor configured to determine whether the second network setting data stored in the removable recording medium is readable from the removable recording medium, and to determine whether the medium use setting data stored in the memory includes data indicating that the operating apparatus is required to access the removable recording medium,
wherein, when the second network setting data is not readable from the removable recording medium, and when the medium use setting data stored in the memory includes data indicating that the operating apparatus is required to use the second network setting data stored in the removable recording medium, the processor prohibits the operating apparatus from performing an action including at least one of accepting an operation request specifying the destination operating apparatus belonging to the first network setting data, and connecting to the operating apparatus to a network, and
when the second network setting data is not readable from the removable recording medium, and when the medium use setting data stored in the memory further includes data indicating that the operating apparatus is not required to use the second network setting data stored in the removable recording medium, the processor allows the operating apparatus to perform the action.

2. The operating apparatus of claim 1, wherein the action includes accepting the operation request and connecting the operating apparatus to a network.

3. The operating apparatus of claim 1, further comprising:
a user interface configured to allow a user to input updated network setting data; and
a memory configured to store the updated network setting data,
wherein the processor is further configured to prohibit the memory from storing the updated network setting data when the updated network setting data is not writable onto the removable recording medium.

4. The operating apparatus of claim 1, further comprising:
a user interface configured to allow a user to input updated network setting data,
wherein the processor is further configured to prohibit the operating apparatus from performing the action including at least one of accepting the operation request and connecting to the network when the updated network setting data is not writable onto the removable recording medium.

5. The operating apparatus of claim 1, further comprising:
a user interface configured to receive a user instruction for setting the medium use setting data from a user,
wherein the processor is further configured to determine whether the user is an authorized user to generate a determination result and prohibit the user interface from displaying a medium use setup screen when the determination result indicates that the user is an unauthorized user.

6. The operating apparatus of claim 5, wherein the determination result is made based on a specific user operation performed on the user interface.

7. The operating apparatus of claim 1, wherein the removable recording medium further comprises operation setting data to be used for performing the operation request.

8. The operating apparatus of claim 1, wherein the network setting data further comprises encryption information to be used for communication via the wireless network.

9. The operating apparatus of claim 1, wherein the wireless identification information is a service set identifier.

10. A communication system, comprising:
a communication apparatus configured to generate an operation request and send the operation request, the operation request specifying a destination operating apparatus configured to perform an operation requested by the operation request; and
the operating apparatus of claim 1.

11. The operating apparatus of claim 2, wherein the action of connecting the operating apparatus to the network includes switching the operating apparatus to be in an on-line state.

12. The operating apparatus of claim 7, wherein the operation setting data includes at least one of information indicating a form to be used for printing, information indicating a font to be used for printing, information indicating a sheet tray storing a recording sheet to be used for printing, information indicating an emulation program to be executed when printing, and information indicating a type of the recording sheet to be used for printing.

13. The operating apparatus of claim 5, wherein, when the user is an authorized user, the processor requests the user to set the medium use setting data through the medium use setup screen to cause the medium use setting data to include data indicating whether the operating apparatus is required to access a removable recording medium to search for setting data stored therein, and to include data indicating whether the operating apparatus is required to use setting data stored in the removable recording medium.

14. A method of controlling an operating apparatus, the method comprising:
   receiving an operation request from a wireless network, the operation request specifying a destination operating apparatus configured to perform an operation requested by the operation request;
   storing a first network setting data in a memory, the first network setting data comprising destination identification information for uniquely identifying the operating apparatus;
   storing a medium use setting data in the memory, wherein the medium use setting data comprises data indicating whether the operating apparatus is required to access a removable recording medium to search for setting data stored therein, and data indicating whether the operating apparatus is required to use setting data stored in the removable recording medium;
   determining, when the medium use setting data stored in the memory includes data indicating that the operating apparatus is required to access the removable recording medium, whether a second network setting data is readable from the removable recording medium provided to the operating apparatus, the second network setting data comprising destination identification information to be used for uniquely identifying the destination operating apparatus specified by the operation request and wireless identification information for uniquely identifying a wireless network to which the destination operating apparatus belongs;
   prohibiting the operating apparatus from performing an action when the second network setting data stored in the removable recording medium is not readable from the removable recording medium and when the medium use setting data stored in the memory further includes data indicating that the operating apparatus is required to use the second network setting data stored in the removable recording medium, wherein the action comprises at least one of accepting an operation request specifying the destination operating apparatus belonging to the first network setting data and connecting the operating apparatus to a network; and
   allowing the operating apparatus to perform the action, when the second network setting data is not readable from the removable recording medium and when the medium use setting data stored in the memory further includes data indicating that the operating apparatus is not required to use the second network setting data stored in the removable recording medium.

15. The method of claim 14, further comprising:
   receiving a user input that requests updating of the network setting data;
   prohibiting the operating apparatus from performing the action including at least one of accepting the operation request and connecting to the network when the updated network setting data is not writable onto the removable recording medium.

16. A non-transitory computer readable medium storing computer instructions which, when executed by a processor, cause the processor to perform operations comprising:
   receiving an operation request from a wireless network, the operation request specifying a destination operating apparatus configured to perform an operation requested by the operation request;
   storing a first network setting data in a memory, the first network setting data comprising destination identification information for uniquely identifying the operating apparatus;
   storing a medium use setting data in the memory, wherein the medium use setting data comprises data indicating whether the operating apparatus is required to access a removable recording medium to search for setting data stored therein, and data indicating whether the operating apparatus is required to use setting data stored in the removable recording medium;
   determining, when the medium use setting data stored in the memory includes data indicating that the operating apparatus is required to firstly access the removable recording medium, whether second network setting data is readable from the removable recording medium provided to the operating apparatus, the second network setting data comprising destination identification information to be used for uniquely identifying the destination operating apparatus specified by the operation request and wireless identification information for uniquely identifying a wireless network to which the destination operating apparatus belongs;
   prohibiting the operating apparatus from performing an action when the second network setting data stored in the removable recording medium is not readable from the removable recording medium and when the medium use setting data stored in the memory further includes data indicating that the operating apparatus is required to use the second network setting data stored in the removable recording medium, wherein the action comprises at least one of accepting an operating request specifying the destination operating apparatus belonging to the first network setting data and connecting the operating apparatus to a network; and
   allowing the operating apparatus to perform the action, when the second network setting data is not readable from the removable recording medium and when the medium use setting data stored in the memory further includes data indicating that the operating apparatus is not required to use the second network setting data stored in the removable recording medium.

17. The computer readable medium of claim 16, wherein the operations further comprise:
   receiving a user input that requests updating of the network setting data; and
   prohibiting the operating apparatus from performing the action including at least one of accepting the operation request and connecting to the network when the updated network setting data is not writable onto the removable recording medium.

* * * * *